United States Patent [19]

Lauer

[11] 4,106,185

[45] Aug. 15, 1978

[54] MOTOR MANUFACTURING METHOD, SYSTEM AND METHOD, SYSTEM AND COMPONENTS

[75] Inventor: Richard E. Lauer, Fort Wayne, Ind.

[73] Assignee: General Electric Company, Fort Wayne, Ind.

[21] Appl. No.: 805,701

[22] Filed: Jun. 13, 1977

[51] Int. Cl.$^2$ .................................... H02K 15/06
[52] U.S. Cl. ............................ 29/596; 29/734; 29/736
[58] Field of Search ............... 29/596, 732, 734, 736, 29/606; 140/92.1

[56] References Cited

U.S. PATENT DOCUMENTS

| | | | |
|---|---|---|---|
| 3,324,536 | 6/1967 | Hill | 29/734 |
| 3,402,462 | 9/1968 | Walker et al. | 29/596 |
| 3,481,372 | 12/1969 | Eminger et al. | 140/92.1 |
| 3,557,432 | 1/1971 | Pavesi | 29/736 |
| 3,624,891 | 12/1971 | Droll | 29/732 |
| 3,625,261 | 12/1971 | Hill et al. | 140/92.1 |
| 3,672,027 | 6/1972 | Arnold | 29/596 |
| 3,691,606 | 9/1972 | Muskulus | 29/736 |
| 3,698,063 | 10/1972 | Smith | 29/734 |
| 3,762,017 | 10/1973 | Droll | 29/732 |
| 3,828,830 | 8/1974 | Hill et al. | 140/92.1 |
| 3,829,953 | 8/1974 | Lauer et al. | 29/734 |
| 3,874,424 | 4/1975 | Muskulus | 140/92.1 |
| 3,977,444 | 8/1976 | Lauer et al. | 140/92.1 |

OTHER PUBLICATIONS

"Winding and Inserting Unit with Automatic Conveyor System" Pub. No. 1.11.IX.71.10 by Fickert available before 4/73.

*Primary Examiner*—Carl E. Hall
*Attorney, Agent, or Firm*—Ralph E. Krisher, Jr.; A. Burgess Lowe

[57] ABSTRACT

Methods and apparatus are disclosed for fabricating dynamoelectric machine magnetic stator assemblies. Coil injection tooling or tool pack is moved into an alignment position at a winding station where it is manipulated to dispose winding turns directly on the tool pack. The tool pack with winding turns thereon and a magnetic core are moved to a loading station where both are positioned and aligned on a transporting device. A conditioning arrangement adjusts the transporting device and simultaneously adjusts an injection machine for the particular stator core height. The transporting device is then moved and aligned at an injection station where the injection tooling is transferred from the transporting device to a coil injection machine. The magnetic core is aligned with the transferred injection tooling and then the injection machine is activated to cause simultaneous insertion of the winding turns and insulating wedges into axial slots of the magnetic core with the core being retained in position during the coil injection operation by core abutment means located on the core support. The transporting device is again moved to receive the empty blade pack or injection tooling as it is ejected from the injection machine. The magnetic core and the tool pack are moved by the transporting device to an unloading station where both are removed from the transporting device with the empty tool pack being transferred back to the coil winding station for a repeat of the above-described cycle for fabricating another stator core assembly.

23 Claims, 44 Drawing Figures

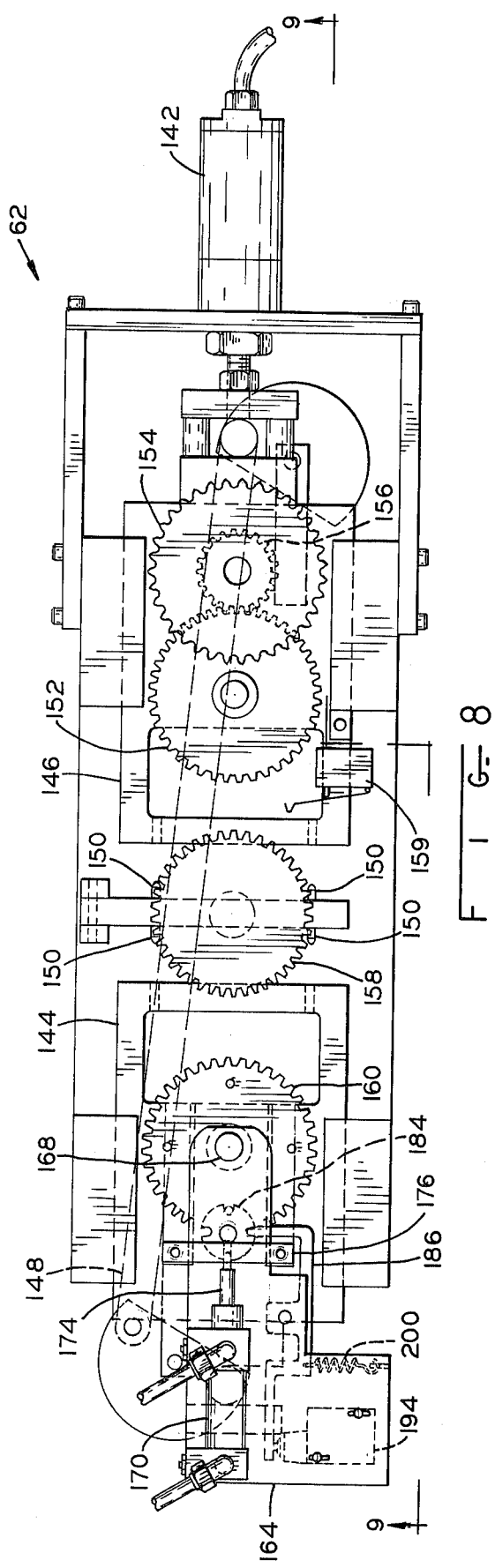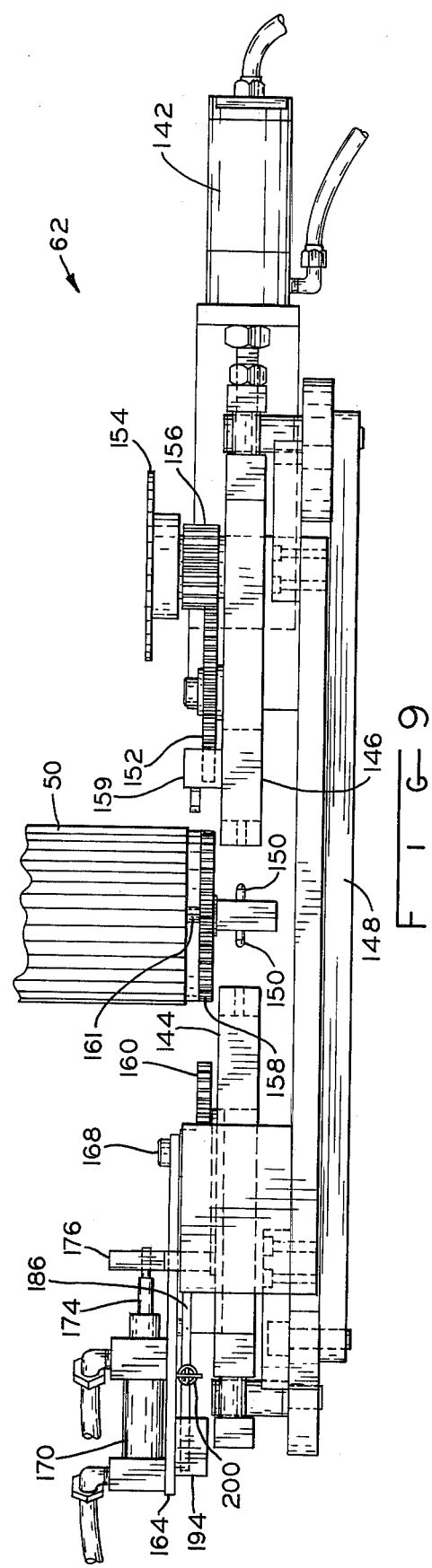

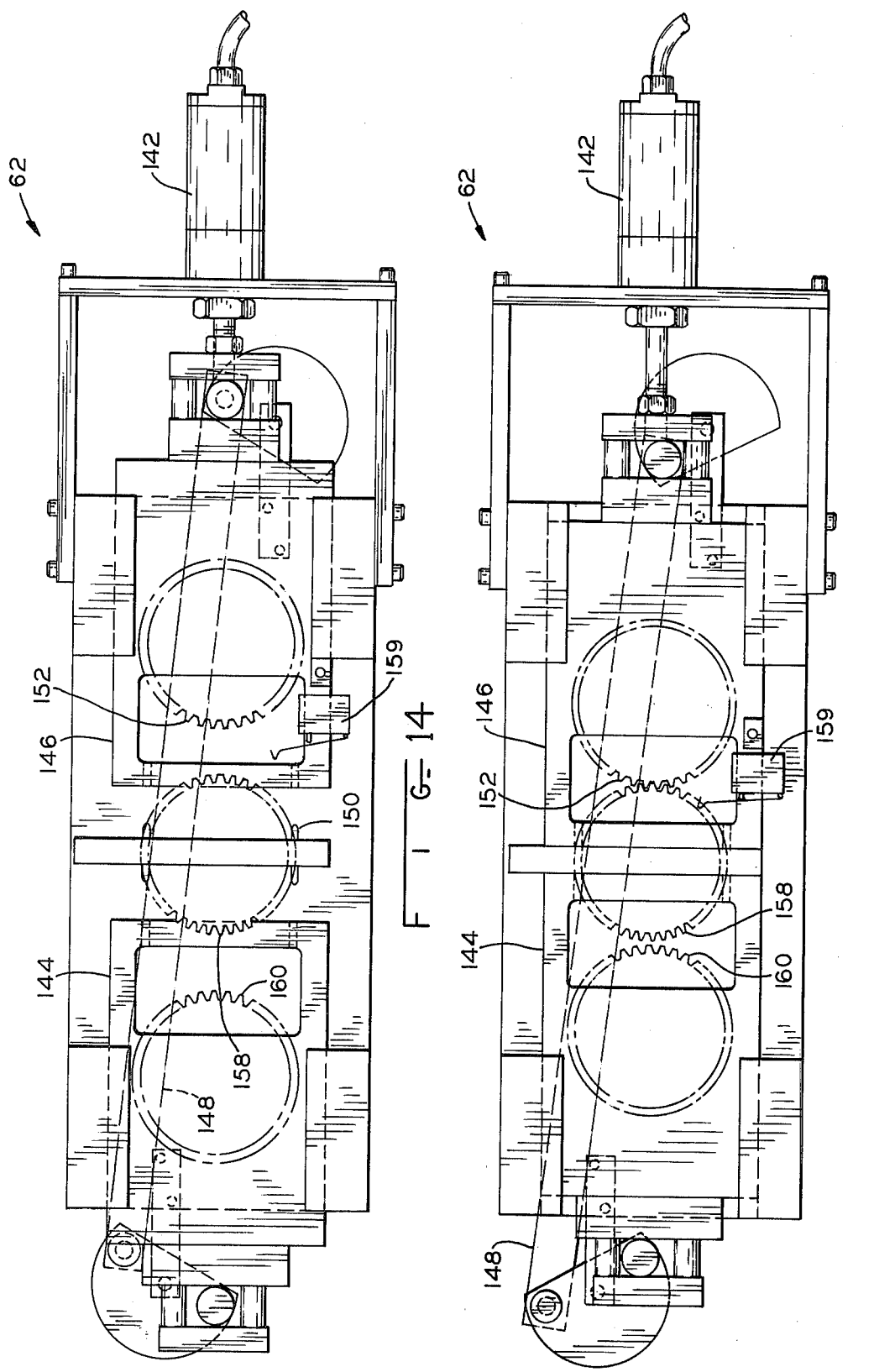

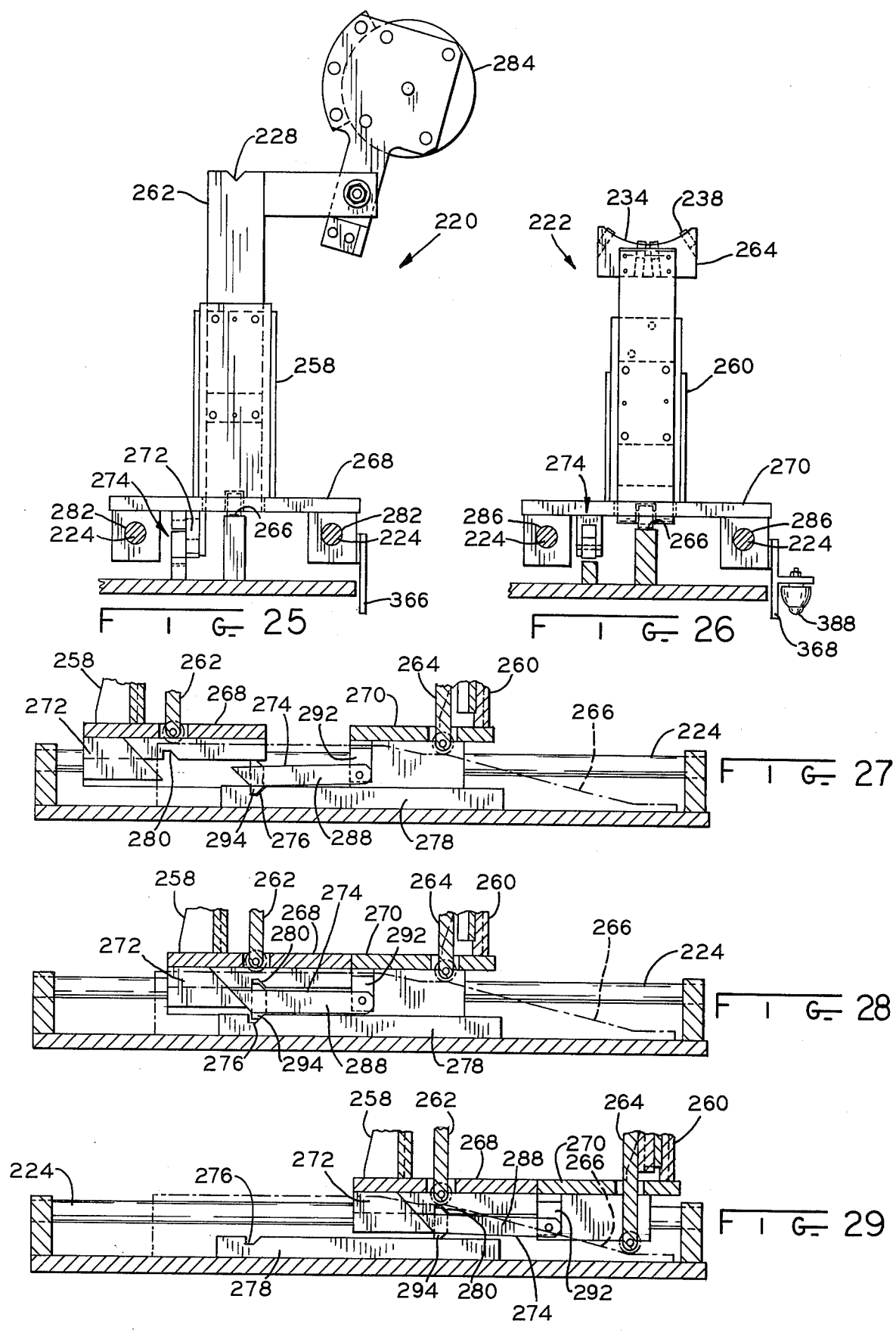

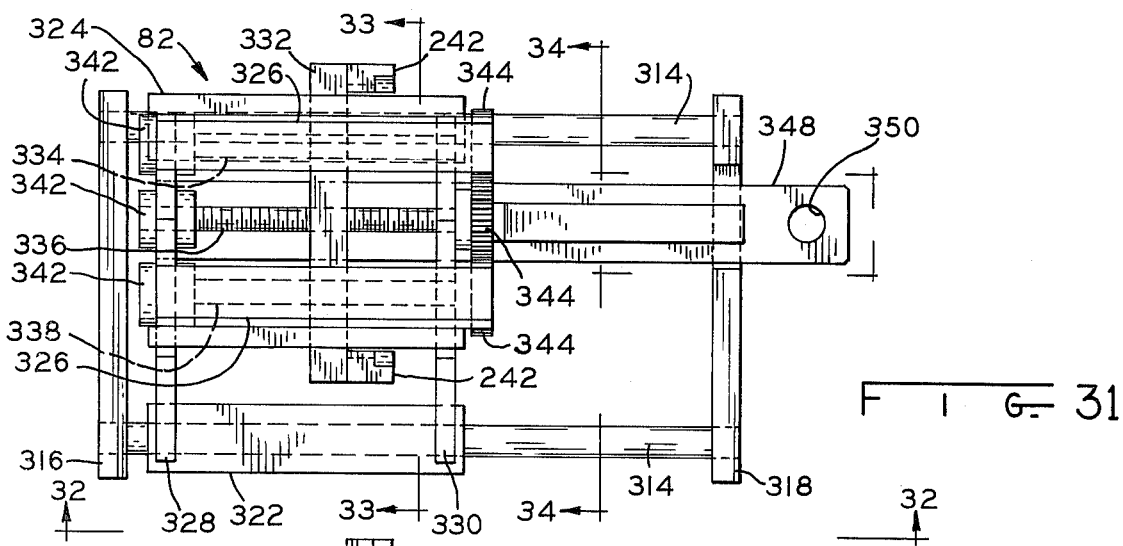
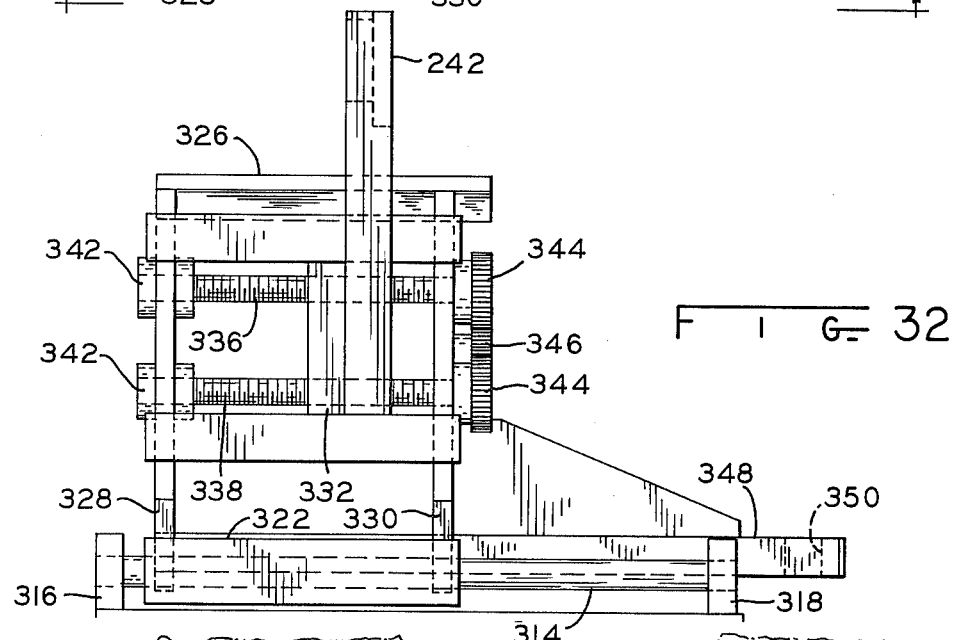
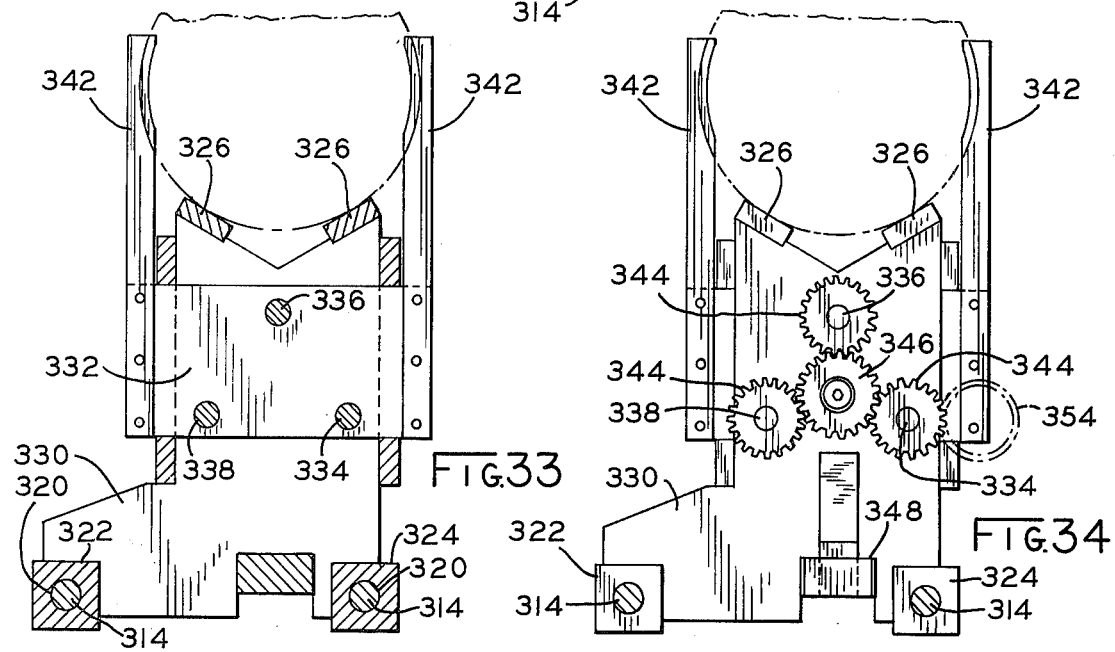

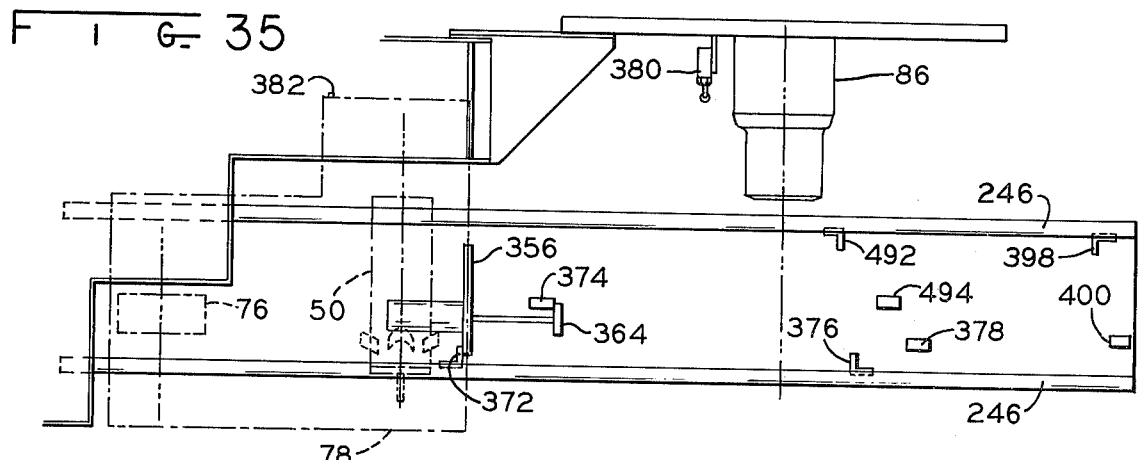
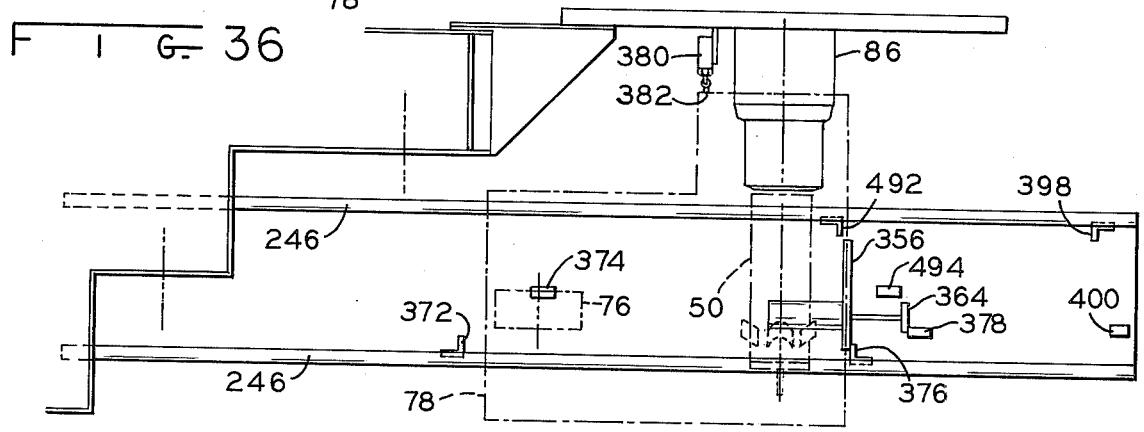
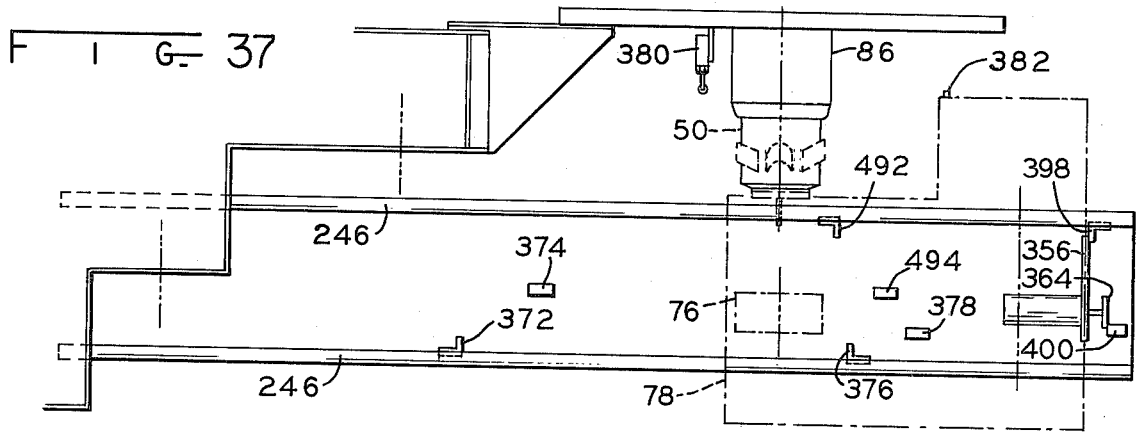
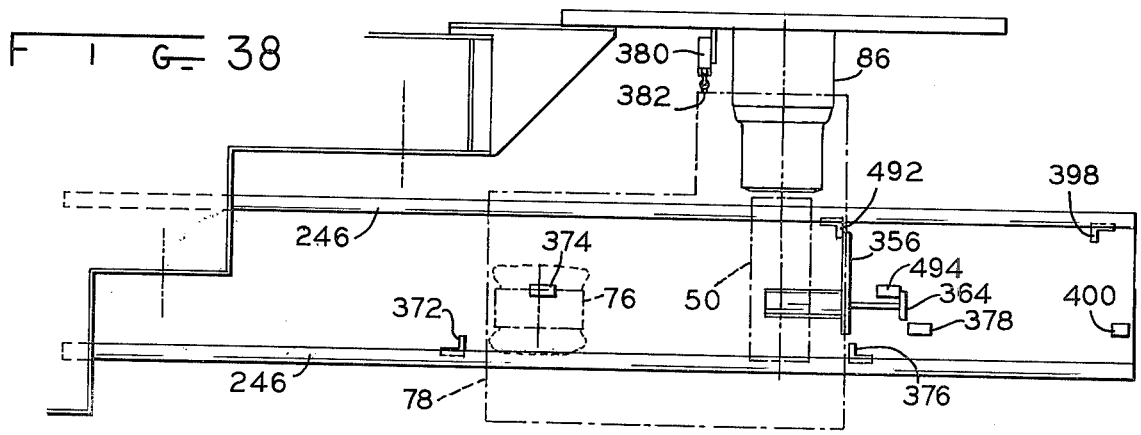

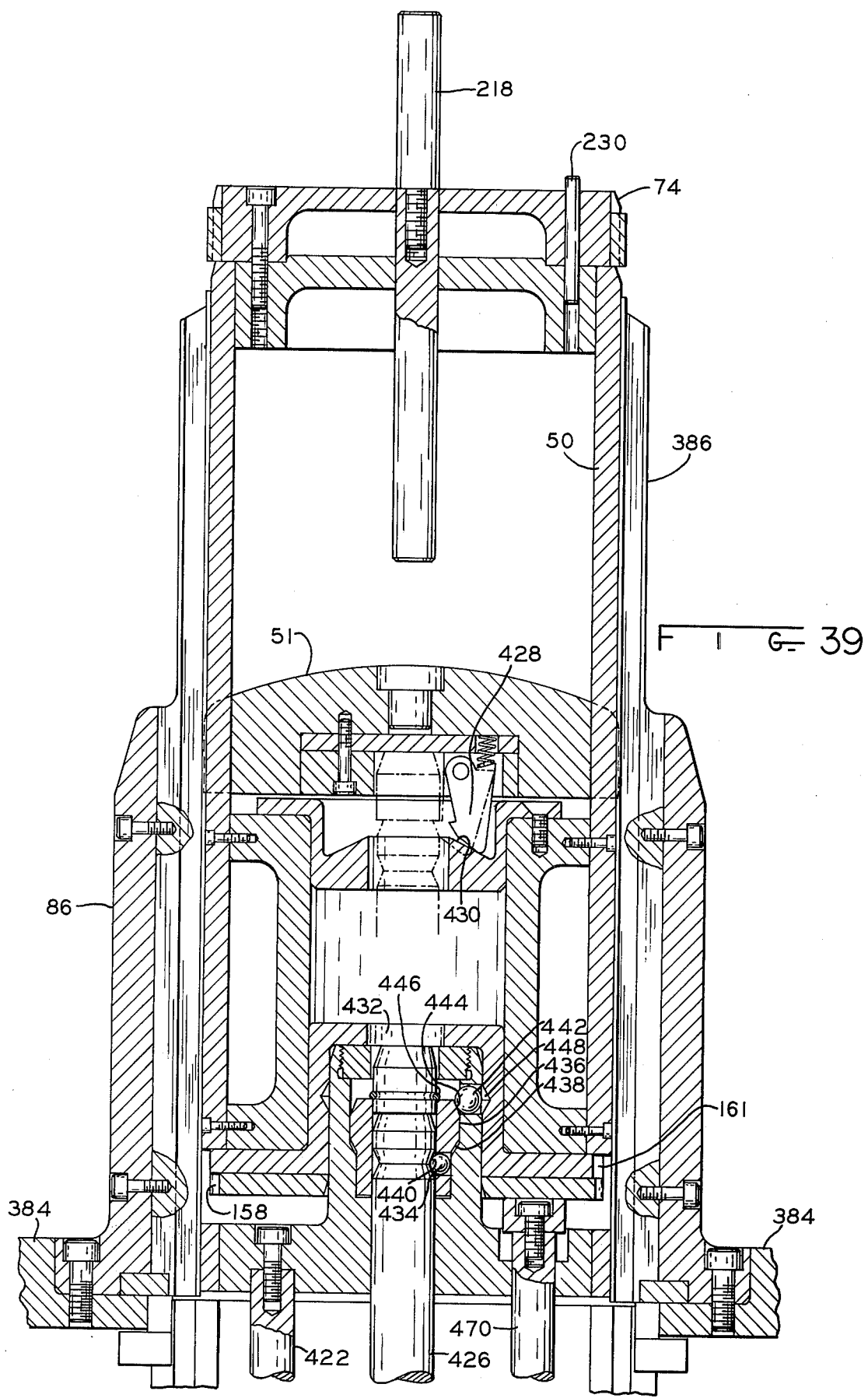

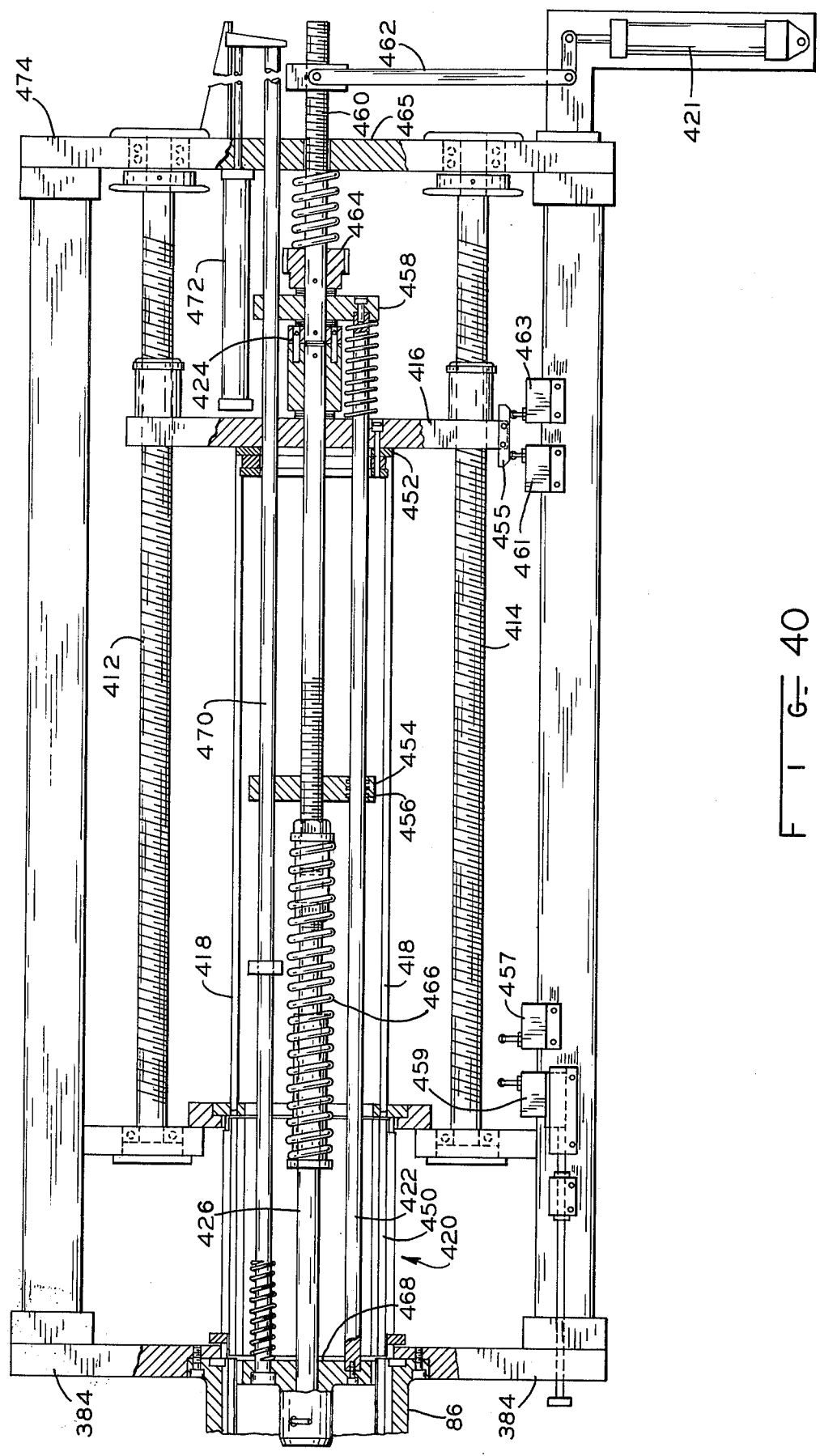

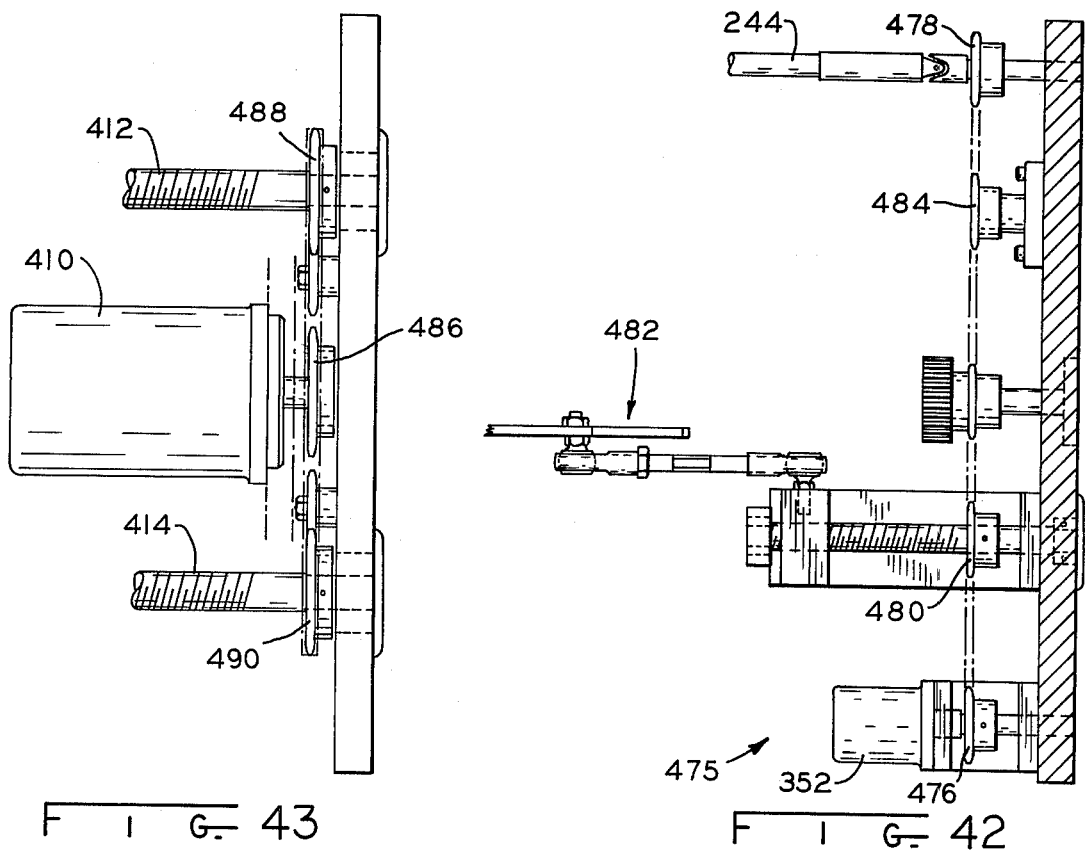
FIG. 43
FIG. 42
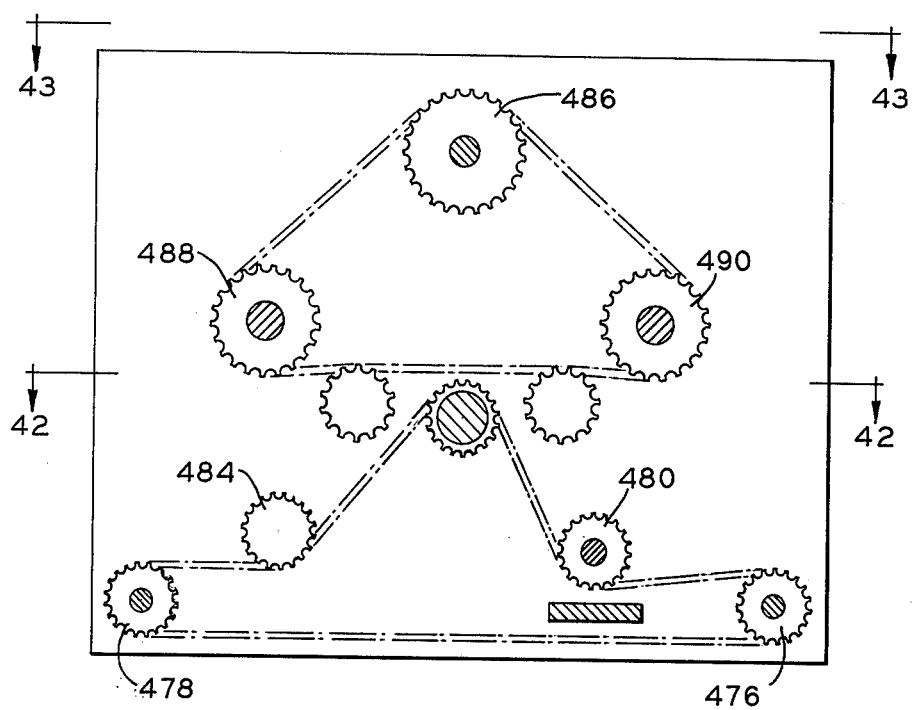
FIG. 41

MOTOR MANUFACTURING METHOD, SYSTEM AND METHOD, SYSTEM AND COMPONENTS

BACKGROUND OF THE INVENTION

This invention relates to methods and apparatus of particular use in the manufacture of dynamoelectric machine magnetic stator assemblies and more particularly to improved methods and apparatus involving placement of winding turns in injection tooling; transporting injection tooling along with a magnetic core to an injection station; transferring injection tooling with the injection machine; aligning a magnetic core with the transferred injection tooling; axially injecting coils on the injection tooling into axial slots of the magnetic core; and removing injection tooling from the injection machine.

In the construction of magnetic stator cores used in dynamoelectric machines, such as electric motors and generators, it has become necessary, primarily for reasons of economy, to maximize equipment utilization through the development of new and improved methods of fabricating such cores. Conventional methods and apparatus are known whereby coil winding and insertion are performed at a single operating station but since generally there are large discrepancies in time for performing the winding operation versus the insertion operation, the equipment generally is not being efficiently utilized. Other techniques have been known whereby coil winding and coil insertion have been performed at different stations on a rotary indexing table arrangement, but such methods because of winding time versus coil insertion time still do not always result in a highly efficient utilization of equipment.

Other known methods and apparatus such as disclosed in Patent No. 3,691,606 have employed the transportation of a wedge guide housing with injection tools therein between coil winding and coil injection stations. This type of approach improves equipment utilization in that multiple winding machines may be employed with a lesser number of coil insertion stations.

However, the requirement of an entire wedge guide housing for each coil insertion tool results in an added expense and problems may occur with insertion tools which would necessarily require removal of both the wedge guide housing and the insertion tooling. Further, a transporting assembly with no provision for moving a core apart from insertion tooling may require a separate station having additional equipment and/or operator to load the core. In addition, further provisions must be made to compensate for different stator core heights and for preventing core movement during the insertion operation.

In order to fabricate windings for different stator core height, it has generally been necessary in known prior art approaches to perform equipment adjustments independently at each operating station with such adjustments being time consuming and often requiring shutdown of an entire line.

In addition, known prior art approaches to fabricating stator magnetic cores generally have involved an operational set up either for strictly automatic coil placement on insertion tooling or for manual placement of coil with difficulty being encountered in intermingling both manual and automatic coil placement.

Accordingly, the general object of the invention is to provide new and improved methods and apparatus for fabricating dynamoelectric machine stator cores and a more specific object is providing new and improved ways which overcome the problems and deficiencies mentioned above.

A further object of this invention is to provide methods and apparatus for fabricating dynamoelectric stator assemblies in which separate injection tooling is rapidly selectable for each magnetic core.

A further object is to provide a stator core fabrication process whereby injection tooling apart from a wedge guide housing may be moved into an alignment position at a winding station and then manipulated to perform an entire winding process directly onto the injection tooling at the one winding station.

Another object is to provide ways of fabricating windings for a magnetic core whereby either manual or automatic placement of coils on injection tooling may be used.

Another object is to provide a new and improved way of transporting both injection tooling and a core apart from each other to an injection station.

Another object is to provide new and improved methods of fabricating stator magnetic assemblies of varying core heights.

A further object is to provide a transporting device with provisions for effecting proper alignment of the injection tooling and stator core at different operating stations.

A still further object is to provide a transporting device with core retaining capabilities for use in coil insertion at an injection station.

SUMMARY OF THE INVENTION

In carrying out objects of the invention in one form thereof a transportable tool pack is selected for a particular stator magnetic core and moved to a winding loading station where windings comprising coil groups including different coils each with a predetermined number of turns are developed and loaded onto the tool pack. The loaded tool pack or tool pack with windings thereon and a stator core having a plurality of axially extending winding turn accommodating slots are moved to a loading station where they are transferred and aligned on a transporting device having a core support and tooling support thereon. The core support is adjusted to accommodate the particular stator core height with such adjustment also providing simultaneous conditioning of an injection machine for the particular core height. The transporting device is then moved to an alignment position at the injection machine where the tool pack is inserted into a wedge guide housing of the injection machine. The transporting device is again moved for aligning the core with the inserted tool pack. The core is placed in an interfitting relationship with the inserted tool pack and held in position by a core abutment means of the core support as the injection machine inserts or injects the windings from the blade pack axially into slots of the magnetic core. The transporting device is again moved to accept the tool pack as it is ejected from the injection machine back onto the transporting device. The transporting device is moved to an unloading station where the core and the tool pack are removed with the tool pack being transferred to the winding loading station for a repeat of the above-described cycle for fabricating another stator core assembly.

Apparatus disclosed which may be used to carry out the above-described way of practicing the invention include a walking beam with clamps for retaining and moving an empty tool pack into position at a winding station. An indexing mechanism locks the tool pack into position underneath a winding head and controls its rotation so that coils being wound on a winding form are properly disposed on the tool pack. After it is loaded with coils, the tool pack is moved beyond the winding station by the walking beam where it is released.

A transporting device including a core support and tooling support is disclosed for transporting the loaded tool pack and a stator core to an injection station. The core support, slidably mounted on rails, is provided with adjustable core abutment means to accommodate different core heights and to retain the core during coil insertion at the injection machine. A conditioning arrangement is provided for adjusting the core abutment means in accordance with the axial length or height of the stator core. This arrangement also provides simultaneous adjustment of the injection machine for the core height and provisions may also be made to include the coil winding machine in the simultaneous adjustment operation. The tooling support, also slidably mounted on rails, is provided with a forward support and a rear support with each including support members which are cammed to vary their vertical height to facilitate loading of the tool pack onto the tooling support and also to facilitate insertion of the tool pack into the injection machine.

The loaded tool pack is loaded on the tool support by moving it to a horizontal position using a support tray with a pivotally mounted "L" shaped arm and then separating it from the tray by employing a locking arrangement activated by the tooling support.

A positioner mounted on the tooling support is provided for stopping the transporting device along its rails where different operations must be performed with the positioner being reset by the tooling support as each operation is performed.

The tooling support is employed to insert the loaded tool pack into the injection machine whereupon, the transporting device is moved to align and move the core into an interfitting relationship with inserted tool pack. With the abutment means holding the core, the injection machine moves the blades of the blade pack into the bore of the core, inserts insulating wedges into the slots of the stator core, and then moves a stripper slidably positioned within the tool pack through the interior of the tool pack for inserting the coils into the slots of the stator core.

The transporting device is then moved to accept the empty tool pack as it is ejected from the injection machine, whereupon, the empty tooling and loaded core are transported to an unloading station where the empty tooling is transferred from the tooling support to the tray from which it was initially loaded. The empty tool pack is moved back to the winding station for a repeat of the above-described operation for fabricating another stator magnetic core assembly.

BRIEF DESCRIPTION OF THE DRAWINGS

Other objects of the present invention and their attendant advantages will become readily apparent from the following description taken in conjunction with the accompanying figures in which like reference characters are used to describe like parts throughout the several views:

FIG. 2a is a fragmentary side elevational view of the walking beam, illustrating mounting details of a trigger member;

FIG. 8 is a plan view of the indexing mechanism located at the coil loading station with the tool pack geared base positioned therein;

FIG. 9 is a side elevational view of the indexing mechanism with the tool pack having the geared base positioned therein;

FIGS. 14 and 15 are bottom views of the indexing mechanism illustrating movement of clamping jaws for clamping tool pack;

FIG. 25 is a cross-sectional view of the tooling support illustrating forward support details;

FIG. 26 is a cross-sectional view of the tooling support, illustrating rear support details;

FIGS. 27-29 are side elevational views partly in cross-section and with parts removed of the tooling support, illustrating tooling support operation for loading and unloading the tool pack;

FIG. 31 is a plan view of the core support mounted on the transporting device;

FIG. 32 is a side elevational view of the core support, illustrating details of the core abutment means;

FIG. 33 is a front view of the core support illustrating core positioning thereon;

FIG. 34 is a rear view of the core support, illustrating gear interconnections for adjusting the core abutment means;

FIGS. 35-38 are schematic plan views of the loading and injection stations, illustrating the positions of the transporting device for core and tool pack loading, tool pack insertion, coil injection and empty tool pack removal from the injection machine;

FIG. 39 is a cross-sectional plan view of the wedge guide housing of the injection machine with tool pack and blade aligner therein;

FIG. 40 is a fragmentary cross-sectional plan view of the injection machine, illustrating machine details for performing coil insertion into the stator core;

FIG. 41 is a cross-sectional view of the injection machine, illustrating gearing arrangements for adjustment for core height and for coil injection;

FIG. 42 is a fragmentary plan view of the injection machine illustrating the conditioning arrangement for adjusting the core support and the injection machine in accordance with the stator height; and FIG. 43 is a fragmentary plan view of the injection machine illustrating an injection motor and its interconnection with screw gears for performing coil injection.

DESCRIPTION OF THE PREFERRED EMBODIMENT

Figure 1:
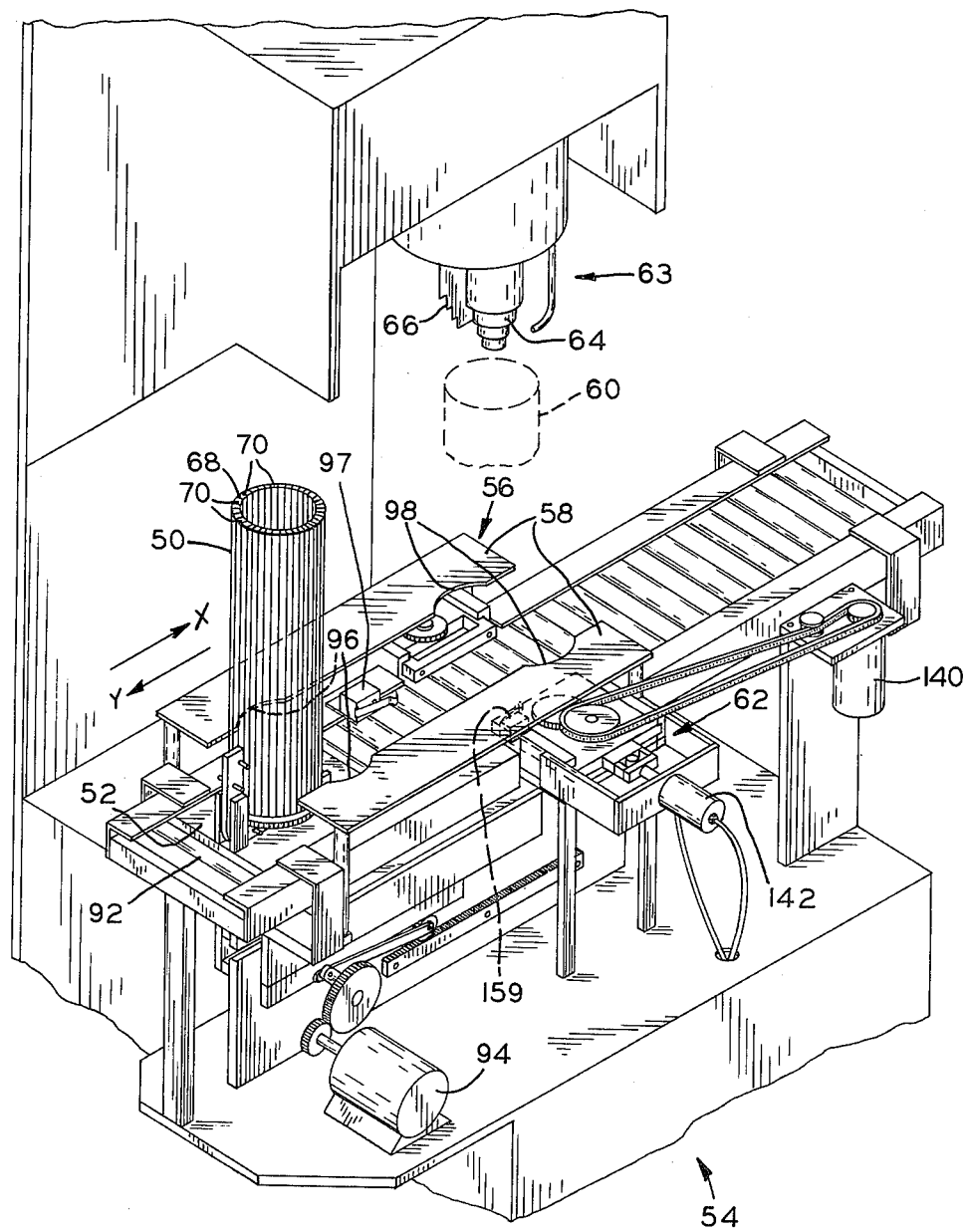
FIG. 1 is a perspective view of a coil loading station embodying teachings of the present invention in one form thereof.
Figure 16:
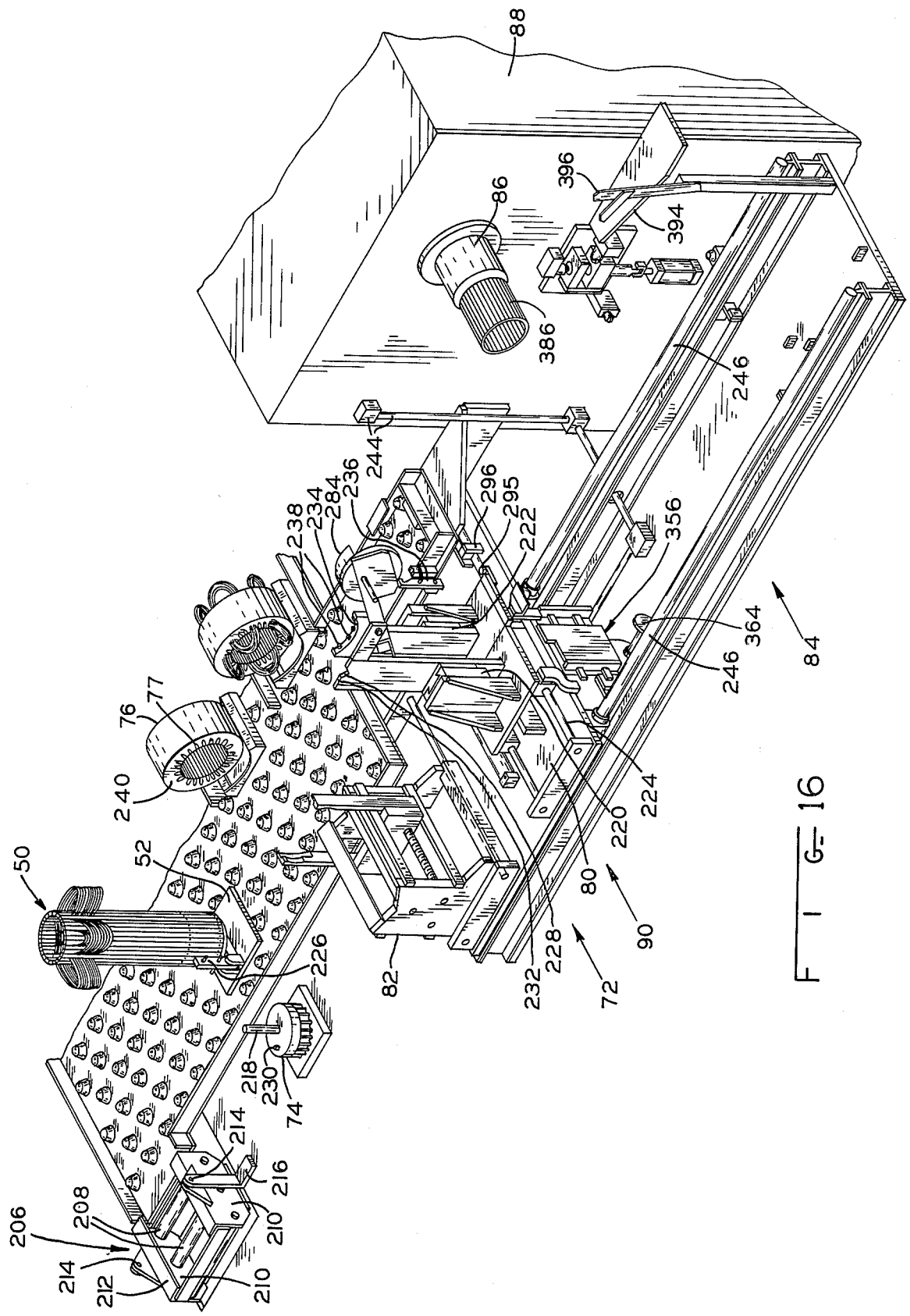
FIG. 16 is a perspective view of the loading coil injection and unloading stations embodying teachings of the present invention in one form thereof.

FIGS. 1 and 16 teach one way of practicing the present invention. Empty coil injection tooling or empty tool pack 50 including a stripper 51 (shown in FIG. 39) slidably mounted therein is positioned on a tray 52 and transferred to a winding loading station 54 as shown in FIG. 1. This transfer is accomplished by walking beam 56 having clamps 58 which close to retain and move the tool pack into an alignment position with a winding head as illustrated by the dotted lines 60. The tool pack is released by the walking beam and locked into position underneath the winding head by an indexing mechanism 62 which controls rotational movement of the tool pack. The winding head 63 is moved downward so that its form 64 is positioned interiorly and its form 66 is positioned exteriorly to the tool pack. The indexing mechanism and forms 64 and 66 of the coil winding head cooperate to develop coils for a winding with each coil comprising a predetermined number of equal diameter winding turns and further cooperate to dispose the coils in openings 68 between blades 70 of the tool pack as the winding turns are developed. After the coils have been developed in the tool pack, the indexing mechanism releases it for subsequent transfer by the walking beam away from the winding loading station. The tool pack is then moved to a first location or station after the winding loading station such as a loading station 72 illustrated in FIG. 16.

While en route to the loading station, a blade aligner 74, illustrated in FIG. 16, is placed in the end of the coil injection tooling or tool pack to provide proper blade separation and support for the tool pack as will be subsequently discussed. At the loading station, the tool pack and a stator core 76 having a plurality of axially extending winding turn accommodating slots 77 are transferred to a transporting means such as the illustrated transporting device 78. The transporting device is provided with an injection tooling support 80 and a core support 82 mounted on second and first portions, respectively, of the device. The tooling support inwardly to a load position as illustrated in FIG. 16 causing roller cam 295 on the tooling support to be received in roller retainer 296, thus locking the transporting device in position at the loading station. The core is then positioned on the core support and the support is adjusted to accommodate the height or axial length of the particular stator core with this adjustment providing simultaneous adjustment of the injection machine for the particular stator core height as will be subsequently discussed. The transfer of the tool pack to the tooling support is accomplished by pivoting the tool pack to a horizontal position and then moving the tool pack and tooling support to an "out" position causing the tool pack to separate from its supporting tray and to be fully supported by the tooling support.

After the core and the tool pack have been transferred to the transporting device, the transporting device is then moved to a second location such as the illustrated coil injection station 84 with the tool pack being aligned with a wedge guide housing 86 of a coil injection machine 88. Once in alignment, the loaded tool pack or injection tooling is transferred into the wedge guide housing by moving the tooling support to a full "in" position causing the tool pack to be slidably received within the wedge guide housing. This inward movement causes the tooling support to release the transporting device for further movement after the tool pack has been transferred to the wedge guide housing. After the injection tooling has been fully inserted into the wedge guide housing, the transporting device is moved to align the core with the inserted injection tooling and locked into position. The core is slidably placed over or in an interfitting relationship with the injection tooling by moving the core support inwardly toward the injection machine. The injection machine is then activated to strip the coils from the tool pack and axially insert the coils into the axially extending slots of the core with the core being retained during this insertion process by the core support. The injection machine also inserts insulating wedges into the slots of the core substantially simultaneously with the coil insertion.

After the coils have been inserted into the core and the core support unlocked, the injection tooling is transferred back onto the transporting device by moving the transporting device to align the tooling support with the empty tool pack within the wedge guide housing. When aligned, the injection machine ejects the coil injection tooling or empty tool pack, from the wedge guide housing onto the tooling support of the transporting device. The transporting device is then moved to an unloading station 90.

At the unloading station, the core with coils inserted in its slots is removed from the core support and conveyed away from the unloading station. In addition, the empty injection tooling is transferred from the transporting device back into the transporting tray 52 by moving the tooling support inwardly to allow the tool pack to be slidably received on the tray and moving the empty tool pack to a vertical position where it is fully supported by the tray. The empty tool pack is then transferred back to the winding loading station 54, ready for a repeat of the above-described cycle.

In practicing the invention, the walking beam 56 is employed to move the tool pack into position at the winding loading station and to move the tool pack beyond the station after coils are loaded thereon. As shown in FIG. 1, the walking beam includes two clamps 58 which are driven "open" and "closed" and also driven laterally relative to conveyor 92 by motor 94. As shown in FIG. 1, the clamps are "open" with the beam nearing the end of its travel in direction "Y". In operation, continued movement in direction "Y" causes the clamps to close, retaining the tool pack in recesses 96 and then the walking beam reverses direction to move in direction "X" toward the winding head. During its movement toward the injection machine, the empty tool pack causes actuation of limit switch 97 which is interconnected with the winding machine so that the subsequent winding operation will occur only if an empty tool pack is in fact being moved underneath the winding head. As the walking beam moves the empty tool pack underneath the winding head as illustrated by the dotted lines 60, the clamps open to release the tool pack. After coils have been developed and loaded onto the tool pack by the winding machine, the walking beam motor is again energized causing the walking beam to move in direction "Y" with its clamps still "open". As the beam nears the end of its travel in direction "Y", the clamps are again closed to retain the loaded tool pack in its recesses 98 and to retain another empty tool pack in its recesses 96. In order to assure that the next empty tool pack is properly positioned to be received within the recesses of the walking beam, a cylinder operated stop (not shown) could be provided. Actuation of the cylinder would cause the stop to move into the path of the tool pack tray, thus stopping the tool pack at a proper position to enable retention by the walking beam. The cylinder would then be deactivated causing the stop to move out of the tray path to allow the walking beam to move the tool pack. After it has moved in direction "Y" to retain the next empty tool pack and the loaded tool pack within its recesses, the walking beam again reverses direction to move in direction "X" moving the loaded tool pack away from the winding loading station and the empty tool pack underneath the winding head where both are released as the clamps again open.

Figure 2:
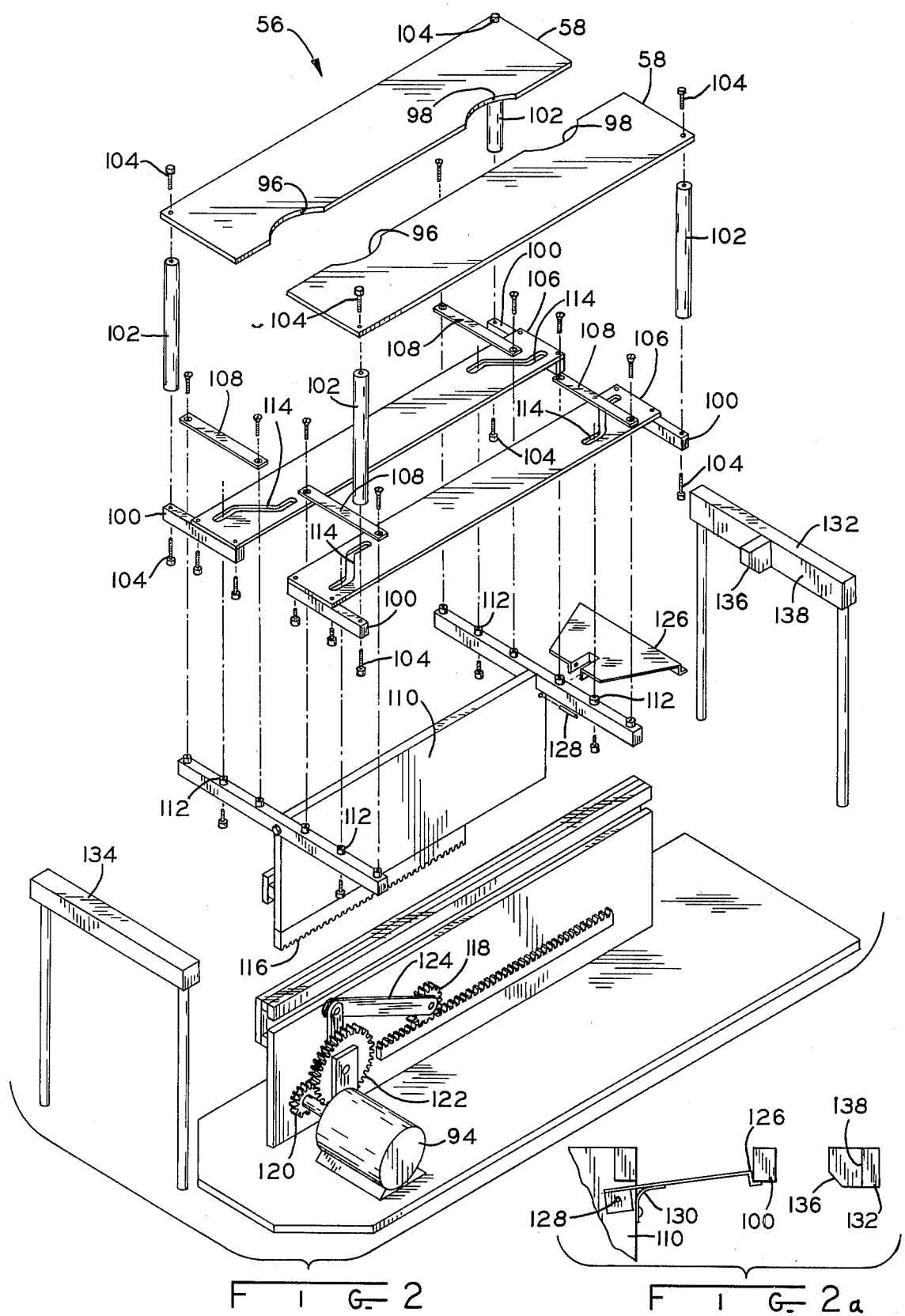
FIG. 2 is a perspective view of the walking beam elements illustrating physical interrelationships.

FIG. 2 shows details of the walking beam of the present invention which provides the above-described lateral movement and clamping operation. As illustrated, the two clamps 58 having recesses 96 and 98 for accommodating tool packs are connected to blocks 100 by spacer members 102 and screws 104. The blocks are connected to and provide support for two cam bars 106 which are placed and retained by members 108 in an overlying relationship with slide 110 so that rollers 112 on the slide are positioned in the recesses 114 of the cam bars. In order to provide movement of the slide, the slide is provided with a geared surface 116 at its bottom portion for engaging gear 118 which is connected to an output gear 120 of the motor 94 by way of gear 122 and arm 124. As illustrated in the FIG. 2a detail, a trigger member 126 attached to the slide by pin 128 and supported by spring 130 cooperates with cam and stop member 132 and reset member 134 for controlling the relative movement between the slide and cam bars for opening and closing the clamps.

Figure 3:
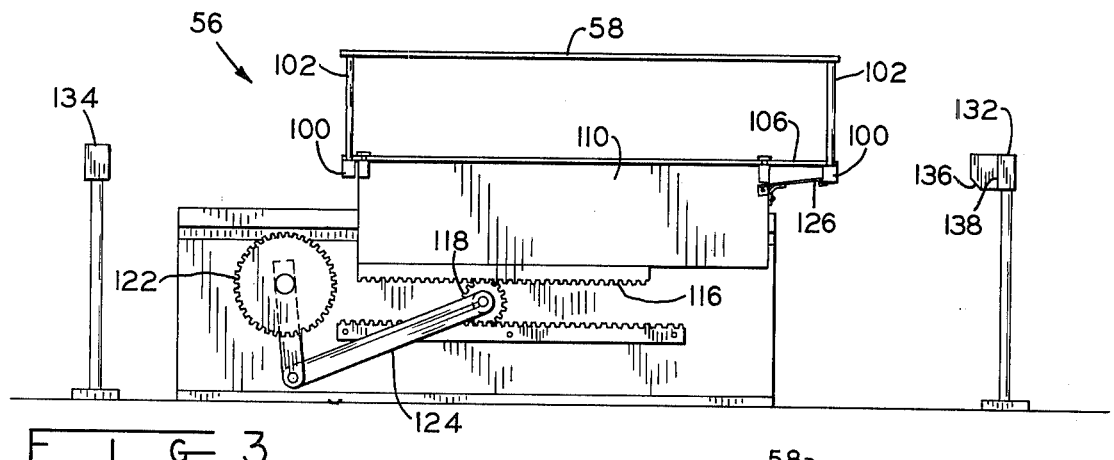
FIGS. 3-7 are side elevational views with parts removed, illustrating the walking beam operation.
Figure 4:
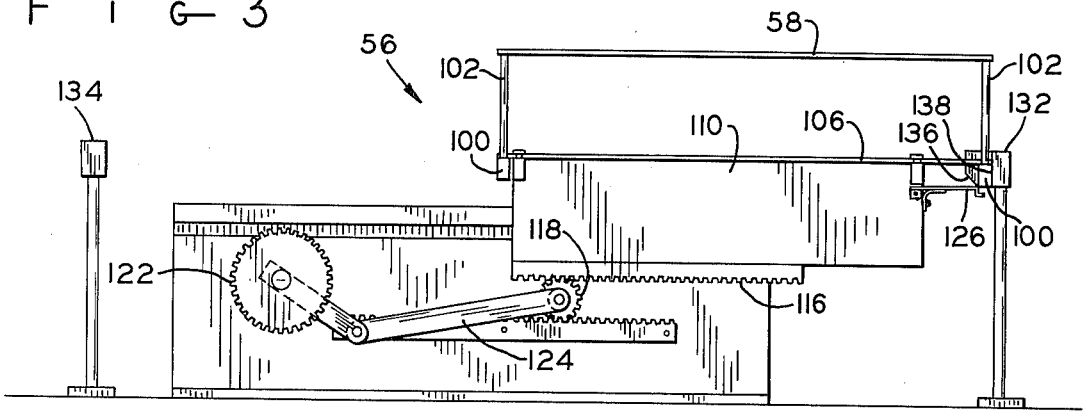
Figure 5:
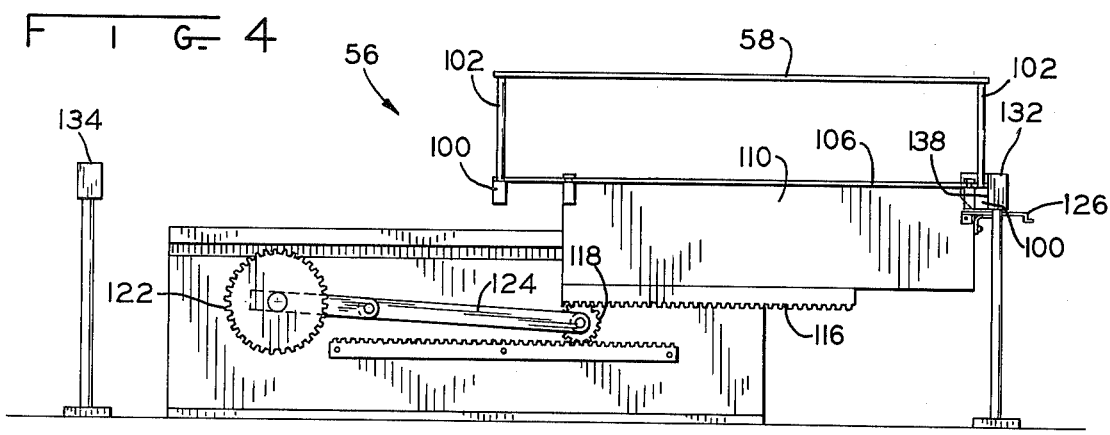

The operation of the walking beam of FIG. 2 is illustrated by FIGS. 3–7. In FIG. 3 the walking beam 56 with the clamps 58 closed is being driven by gear 118 toward the cam and stop member 132. In operation, an empty tool pack would be retained by the closed clamps and movement would be toward the coil loading station to position the tool pack underneath the winding head of the injection machine. Referring to FIG. 4, it can be seen that as the walking beam reaches the cam and stop member, the trigger member 126 is cammed downward by the camming surface 136 on the cam and stop member and the block 100 engages the stop surface 138 on the cam and stop member, thus, it is apparent that the continued movement of the slide causes the slide member to move longitudinally relative to the two clamps 58 and the two cam bars 106 attached to the clamps as illustrated in FIG. 5. If an adjustable stop surface were desired, the cam and stop member could be provided with adjustable stop screws (not shown) for engagement with block 100. Referring back to FIG. 2, it can be seen that this longitudinal movement of the slide relative the cam bars causes the two cam bars to be moved outwardly by the rollers 112 positioned within recesses 114 of the cam bars, thus opening the clamps. In operation, the clamps would open to release the empty tool pack in position underneath the winding head.

Figure 6:
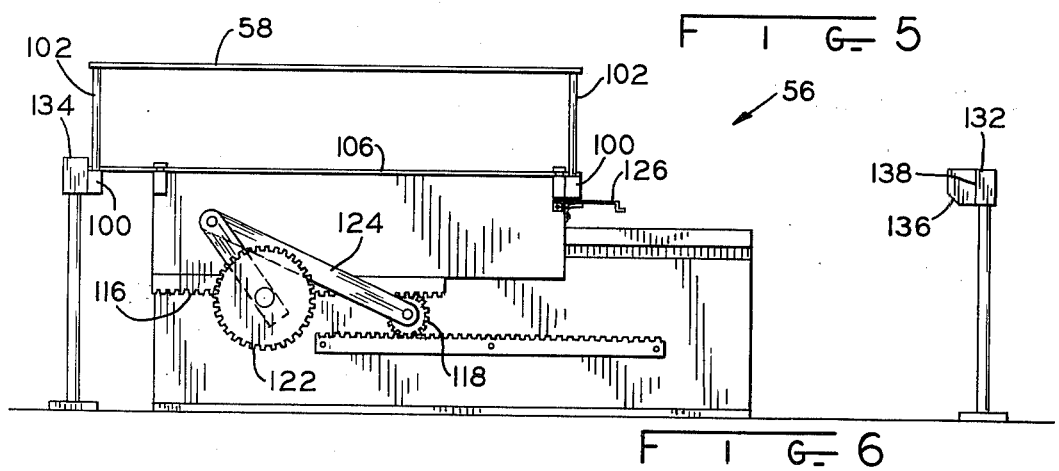
Figure 7:
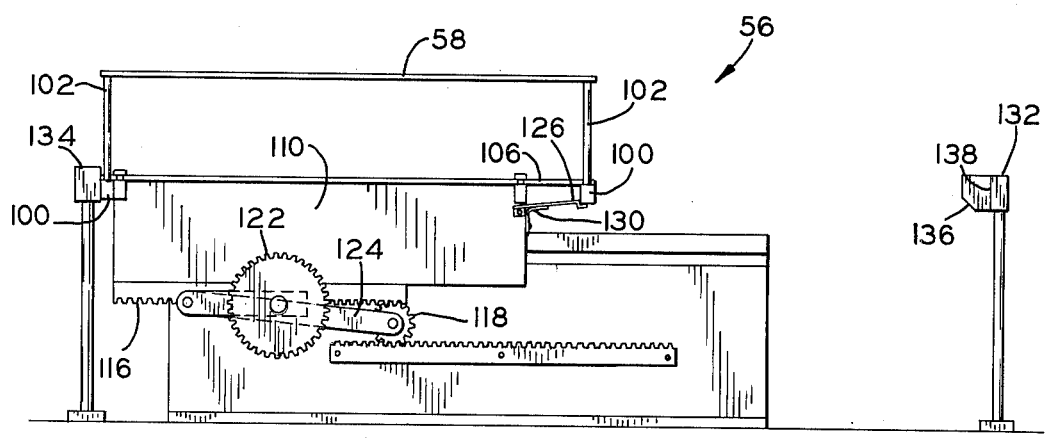

After winding turns have been developed by the winding machine and loaded onto the tool pack, the walking beam gear 122 is again caused to rotate. With continued rotation of gear 122, the arm 124 causes gear 118 to reverse rotational direction, thus driving the slide in the opposite direction as illustrated in FIG. 6. When the blocks 100 engage the reset member 134, the slide 110 continues to move longitudinally relative to the two cam bars causing trigger member 126 to be reset in that it is moved upwardly by spring 130 into engagement with blocks 100 as illustrated in FIG. 7. Referring back to FIG. 2, it can be seen that this longitudinal movement of the slide relative the cam bars causes the two cam bars to be moved inwardly by the rollers 112 positioned within the recesses 114, thus closing the clamps attached to the cam bars. In operation, the clamps would close to retain the loaded tool pack and another empty tool pack for subsequent movement of the loaded tool pack away from the coil loading station and for movement of the empty tool pack underneath the winding head.

Referring to FIG. 1, in order to develop windings directly on the tool pack, the indexing mechanism 62 is employed to control rotation of the tool pack relative to the winding head 63 at the winding loading station 54. As mentioned previously, the walking beam moves the empty tool pack underneath the winding head at the winding loading station. After being released by the walking beam, the tool pack is locked into an alignment position and rotated to a home position by the indexing mechanism which is driven by hydraulic motor 140. The winding head is then moved downward so that its form 64 is positioned interiorly and its form 66 is positioned exteriorly of the tool pack. Coils each comprising a predetermined number of winding turns are then developed on the winding forms and moved directly from the forms into the openings 68 between the blades 70 of the tool pack. The indexing mechanism then rotates or indexes the tool pack a predetermined number of degrees where additional coils are developed on the forms and disposed in the openings of the tool pack. This indexing and winding procedure continues until the desired coil distribution is developed on the tool pack, whereupon the tool pack is released by the indexing mechanism and then moved by the walking beam away from the winding loading station to another location such as another winding station if additional coils are desired or to a location such as loading station 72 illustrated in FIG. 16.

FIGS. 8 through 15 show details of the indexing mechanism employed to produce the above-described rotational movement of the tool pack relative to the winding head for loading coils onto the tool pack. Referring to FIG. 8, the tool pack is locked into position at the winding head by actuating air cylinder 142 which causes two jaw members 144 and 146 interconnected to each other by linkage 148 to move inwardly to receive pins 150 of the tool pack support shown in FIG. 9. Movement of the clamping jaw 146 also causes homing gear 152 which is driven by the hydraulic motor 140 of FIG. 1 through pulley 154 and gear 156 of FIG. 9 to engage tool pack gear 158 as shown in FIGS. 14 and 15. After engagement, the homing gear rotates the tool pack to a home position as determined by a home limit switch 159 which engages notch 161 of the tool pack. Actuation of the home limit switch causes de-energization of the hydraulic motor which stops rotation of the tool pack and also causes an indexing gear 160 to engage the tool pack for rotating it after the winding is completed at the home position.

Figure 10:
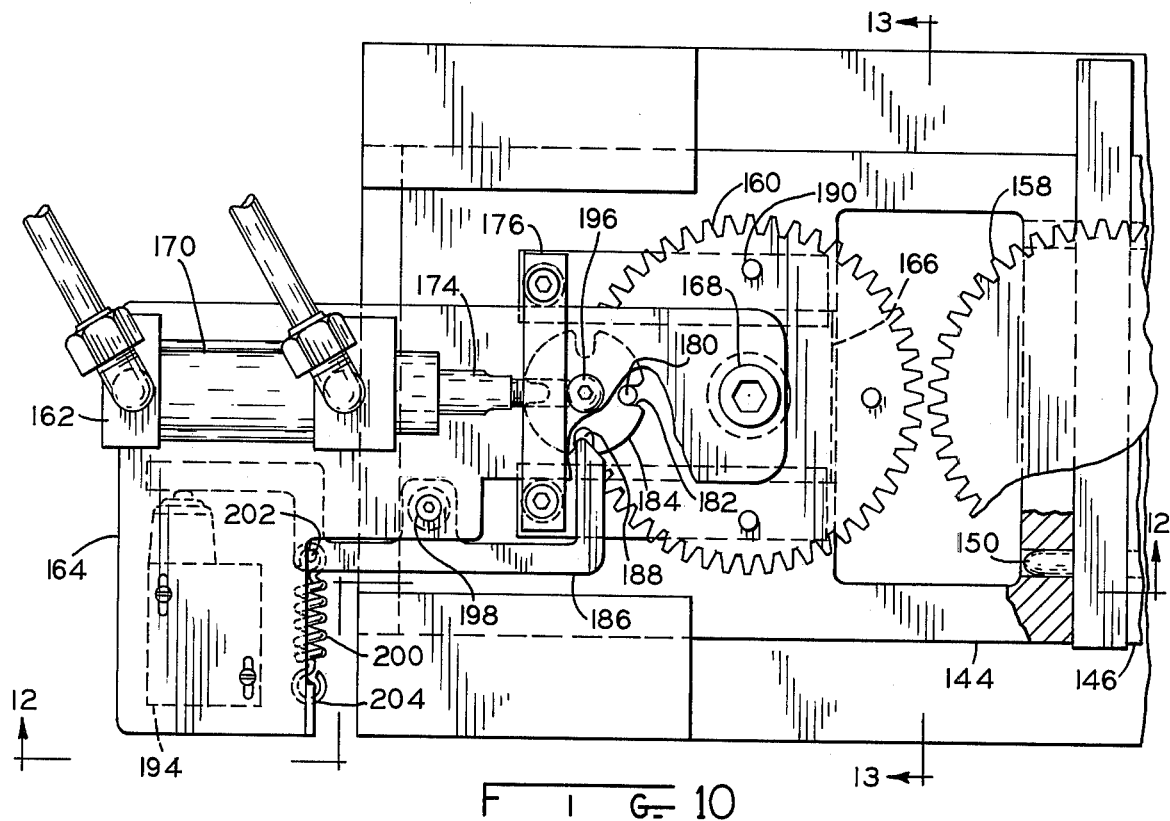
FIGS. 10 and 11 are fragmentary plan views, partly in cross-section, of the indexing mechanism showing an indexing gear arrangement for controlling tool pack rotation relative to the coil winding machine.
Figure 11:
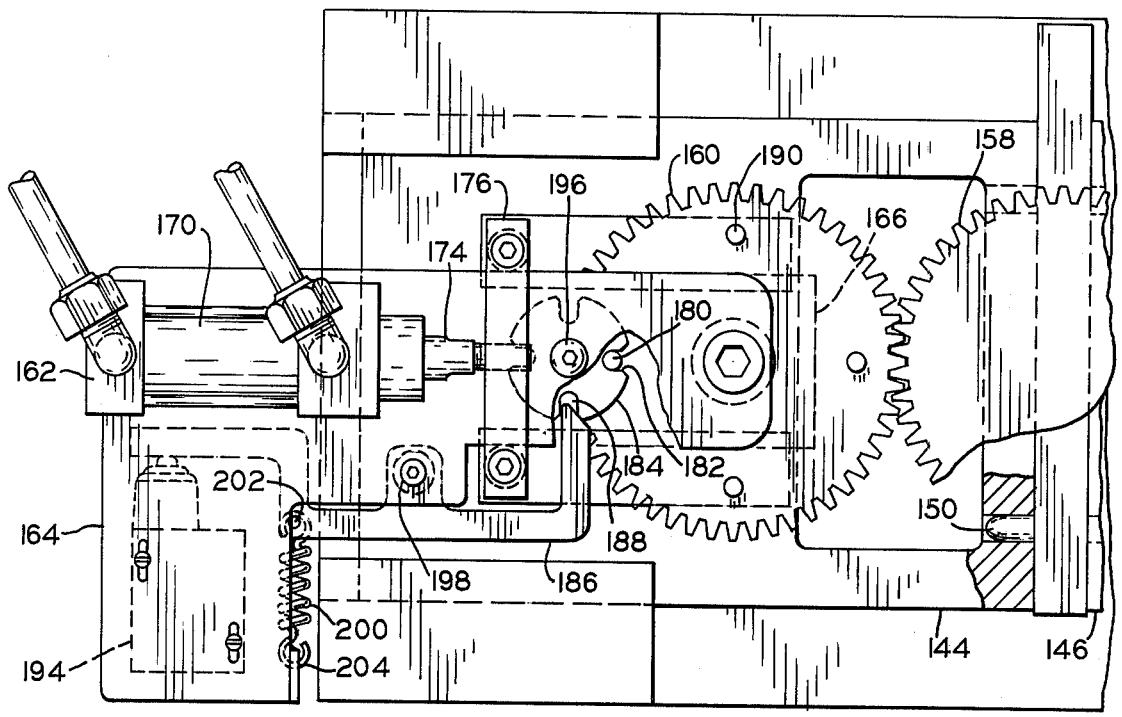

FIGS. 10 and 11 show the movement of the indexing gear 160 to engage the tool pack gear 158. The indexing gear is caused to move into engagement by the home limit switch activating indexing cylinder 162 which in turn moves its base plate 164 causing slide 166 to move within the jaw member 144 (also illustrated in FIGS. 12 and 13). As the slide moves within the jaw, the indexing gear attached thereto by way of shaft 168 also moves to engage the tool pack gear as shown in FIG. 11.

Figure 12:
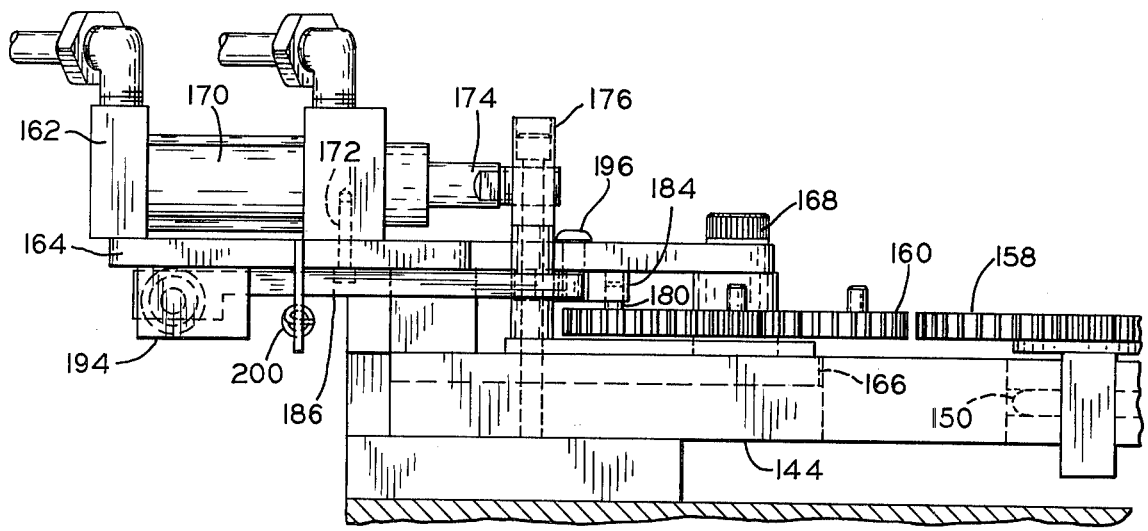
FIG. 12 is a fragmentary side elevational view of the indexing mechanism showing indexing gear control details.
Figure 13:
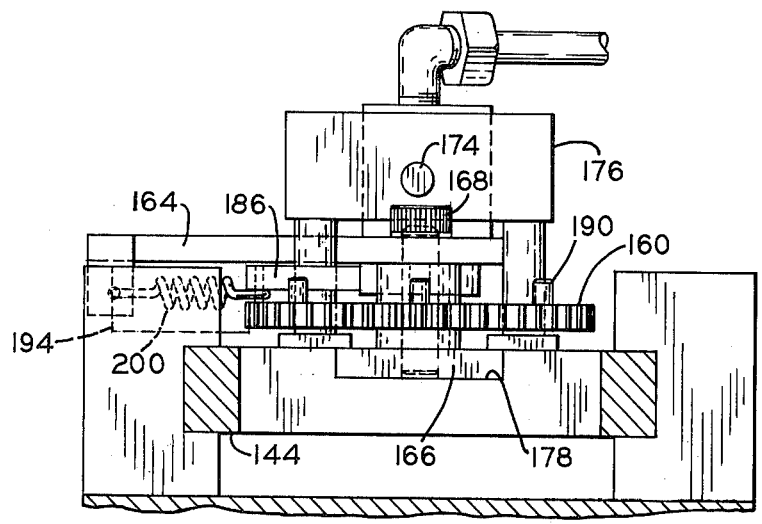
FIG. 13 is a cross-sectional view of the indexing mechanism illustrating indexing gear control details.

Referring to FIGS. 12 and 13, in order to cause movement of the base plate 164 and thus, move the indexing gear into engagement with the tool pack, chamber 170 of the cylinder is attached to the base plate by screw 172 and rod 174 of the cylinder attached to bracket 176 which is fixedly mounted to the jaw 144. The indexing gear shaft 168 is attached at one end to the base plate and at the opposite end to the slide 166 so that movement of the base plate also causes the slide to move in groove 178 of the jaw with the indexing gear being moved therewith into engagement with the tool pack gear.

After the tool pack is rotated to the home position, coils are wound on the winding head forms and moved onto the tool pack. A geneva gear arrangement is then used to control rotation of the tool pack to another position which is a predetermined number of degrees from the home position. The rotation to another position is accomplished by energizing the hydraulic motor of FIG. 1 which causes the homing gear to rotate the tool pack which in turn causes rotation of the indexing gear.

Referring to FIG. 11, rotation of the tool pack through its gear 158 causes index pin 180 attached to the indexing gear to cam out of recess 182 of geneva gear 184 which also causes indexing arm 186 to cam out of recess 188 of the geneva gear. The tool pack continues rotation until indexing pin 190 attached to the indexing gear is received in recess 192 of the geneva gear whereupon the indexing arm is received in the recess 182 causing actuation of limit switch 194. Actuation of the limit switch causes de-energization of the hydraulic motor of FIG. 1, thus stopping rotation of the tool pack. At this position, coils are again wound on the forms of the winding head and loaded upon the tool pack. The rotation or indexing of the tool pack continues until the required coils have been wound and loaded onto the tool pack.

Further details of the geneva gear arrangement are shown in FIGS. 10 and 12. In order to engage the indexing pins of the indexing gear, the geneva gear has its shaft 196 attached at one end thereof to the base plate 164. The limit switch 194 is also attached to the base plate for sensing the position of the geneva gear by way of the indexing arm which is pivotally mounted by pin 198 to the base plate. In order to assure positive engagement within the geneva gear recesses for actuation of the limit switch, the indexing arm is biased by spring 200 attached at one end thereof to the arm at point 202 and attached at the other end thereof to the base plate at point 204.

After the indexing mechanism and winding head have cooperated to load and distribute coils on the tool pack, the tool pack is released by the indexing mechanism and then moved by the walking beam away from the winding loading station to another location such as the loading station 72 illustrated in FIG. 16.

The above-described way of practicing the invention involves loading the coils onto the tool pack as they are being wound. As an alternative, the coils may be wound and then manually disposed within the tool pack. FIG. 16 shows receiving means 206 used to implement this manual placement of coils. The receiving means comprises rollers 208 supported between two end plates 210 with each end plate being provided with an angled top portion 212 extending over and spaced apart from the rollers. Each end plate is in turn pivotally connected by way of pins 214 to two stationary support members 216, thus permitting the receiving assembly to be pivoted relative the stationary members.

In carrying out the manual placement of the coils, the receiving means is moved to a horizontal position. The empty tool pack and its support tray are slid into the receiving means with the base plate of the tray support being received between the rollers and the top angle portion of the side plates. After the empty tool pack and tray have been moved into the receiving means, the empty tool pack is tilted for manual placement of the coils by pivoting the receiving means about the pins 214. After the coils have been disposed within the tool pack, the receiving means in again pivoted, returning it again to a horizontal position and then the tray and tool pack are slid from the receiving means to a conveyor for transfer to the loading station.

FIG. 16 shows the loaded tool pack en route to the loading station from either the winding station or the receiving means. While en route to the loading station, blade aligner 74, having a support projection 218 is slidably placed within the interior and at the top of the tool pack. The loaded tool pack with the blade aligner therein is then transferred to the loading station 72.

At the loading station shown in FIG. 16, the loaded tool pack and a stator core 76 are transferred to the transporting device 78 comprising the core support 82 and the tooling support 80 mounted on first and second portions, respectively, of the device for movement to the coil injection station 84. The transfer of the tool pack and stator core to the transporting device is accomplished by moving forward support 220 and rear support 222 of the tooling support along rails 224 inwardly to a load position as shown in FIG. 16. At this load position, roller cam 295 attached to the tooling support is received in roller retainer 296, thus locking the transporting device in position at the loading station.

The stator magnetic core is then placed on the core support and radially oriented on the support so as to assure proper alignment with the blades of the tool pack at the injection station. The core is also longitudinally positioned on the support so that its face 240 abuts a core abutment means which is retaining arms 242 in the illustrated embodiment. The arms are then adjusted longitudinally utilizing connecting gear arrangement 244 to allow the core support to accommodate the height or axial length of the particular core.

The transfer of the tool pack to the tooling support is accomplished by pivoting the tool pack to a horizontal position utilizing the pivotally mounted "L" shaped arm 226 of the tray 52 so that the blade aligner projection is received in notch recess 228 of the forward support. The tool pack is then rotated on the "L" shaped arm of the tray until aligning pin 230 of the blade aligner abuts top surface 232 of the forward support which provides for subsequent alignment of the tool pack with the wedge guide housing of the injection machine. The forward and rear supports along with the tool pack are then moved to an "out" position so that the tool pack is supported at its top by the blade aligner projection 218 resting in the notched recess 228 of the forward support and supported at its base on cradle-shaped surface 234 of the rear support. Spring locking arrangement 236 retains the tray at the conveyor so that only the tool pack is transferred onto the tooling support. Once transferred, adjustable pads 238 located within the cradle-shaped surface are received in grooves on the outer surface of the tool pack blades to prevent rotation of the tool pack on the tooling support. The pads are adjusted during initial set-up of the equipment so that tool packs once rotated to cause abutment of the aligning pin with the forward support as discussed above will be in alignment with the wedge guide housing when moved to the injection machine. Movement of the tooling support to the "out" position also causes the roller cam 295 to be moved away from roller retainer 296, thus unlocking the transporting device to permit its movement along transporting rails 246 to the coil injection station 84.

Figure 21:
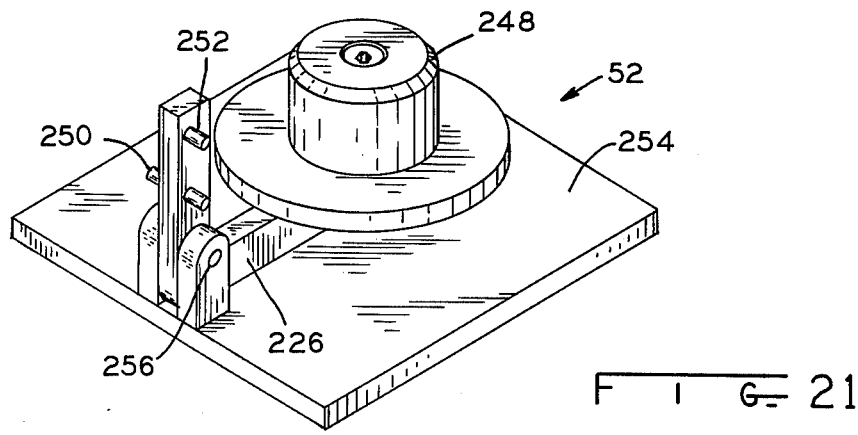
FIG. 21 is a perspective view of the tool pack tray.

Details of the tray 52 which facilitate transfer of the tool pack to the tooling support are illustrated in FIG. 21. The tray is provided with a plug member 248 attached to the "L" shaped arm 226 for slidably receiving the tool pack. The arm having stop pin 250 and locking pin 252 attached thereto is pivotally mounted to tray base 254 by pivot pin 256 for moving the blade pack to a horizontal position for transfer to the tooling support.

Figure 19:
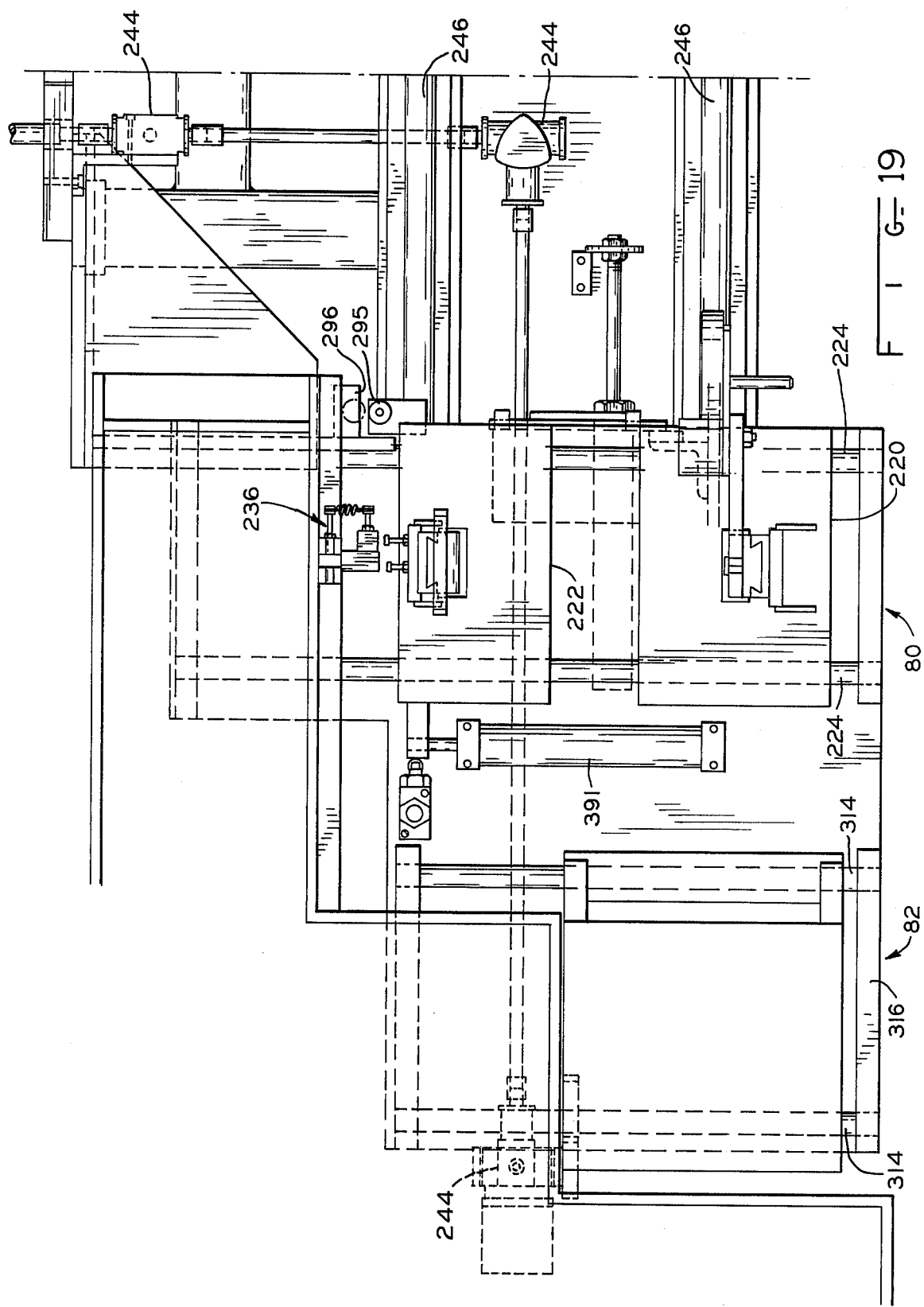
FIG. 19 is a plan view of the loading station illustrating transporting device details.
Figure 24:
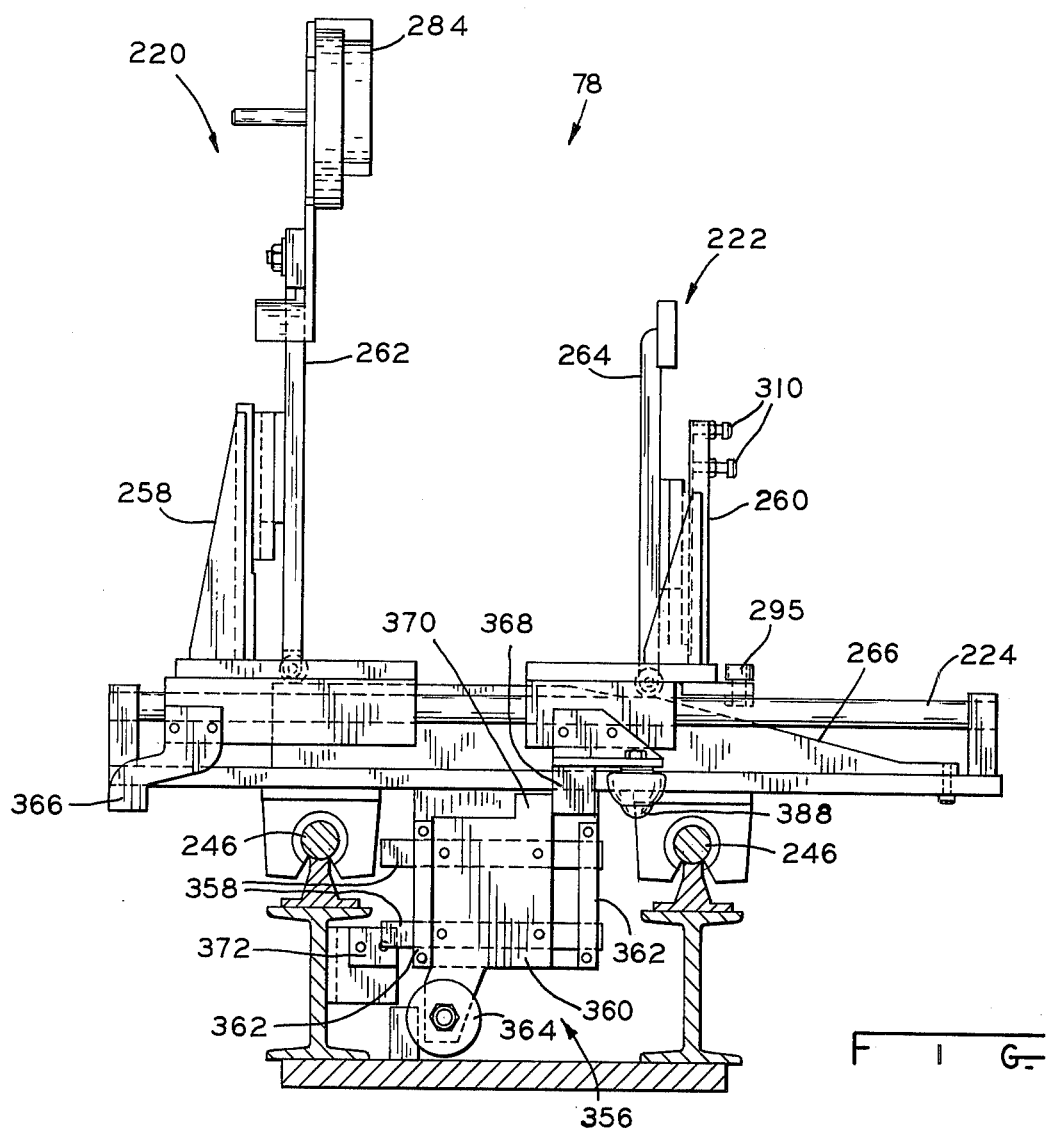
FIG. 24 is a side elevational view of the transporting device, illustrating details of the tooling support.

At the loading station 72 illustrated in FIG. 16 and by a top view of FIG. 19, the tooling support 80 must be moved inwardly from the position as shown in FIG. 19 to a load position as illustrated in FIG. 16 in order to transfer the loaded tool pack onto the tooling support. Referring to FIG. 24 which shows a side view of the tooling support in the out position, this inward movement is accomplished by mounting push member 258 of the forward support 220 and an actuating member 260 of the rear support 222 on the rails 22. In order to further facilitate loading of the tool pack and also to facilitate subsequent insertion at the injection machine, a notched support member 262 of the forward support and a cradle support member 264 of the rear support which support the top and base of the tool pack, respectively, are mounted to ride along cam surface 266 for varying their vertical height.

FIGS. 27 through 29 show side views of the tooling support with parts removed for illustrating operation of the support. In order to move the support inwardly for loading the tool pack onto the transporting device, the push slide 258 is moved along the rails 224 toward the rear support causing the notched support member 262 also to be moved along the cam surface 266 as illustrated in FIG. 27. As base 268 of the push member engages base 270 of the actuating member as shown in FIG. 28, a cam member 272 attached to the base of the push member causes slide interlocking member 274, which is pivotally mounted to the actuating member base, to move out of recess 276 of stationary member 278 and into recess 280 of the push member base, thus locking the two base members together so that the forward and rear supports move simultaneously along the rails.

As shown in FIG. 29, continued movement of the push member would cause both the forward and rear supports to move to the full "in" position which is required for insertion of the tool pack into the wedge guide of the injection machine with the notched support member 262 and the cradle support member 264 being moved downward along the cam surface 266. However, for loading the tool pack onto the tooling support, the forward and rear supports are moved simultaneously a lesser distance to the load position as shown in FIG. 16.

Details of the forward support are illustrated in FIG. 25 which shows a front view of the support. The push member 258 is provided with the base 268 having two drills 282 with bearings therein for mounting on the rails 224. The cam member 272 for disengaging the interlocking member is also attached to the push member base which is also provided with the recess 280 for accepting the interlocking member during outward movement as will be subsequently discussed. The notched support member 262 having the notched recess 228 in its top portion thereof is mounted in abutting relationship with the push member with its base 268 extending through the base of the push slide to rest upon the cam surface 266. The notched support member is also provided with a swingably mounted catcher member 284 for supporting an empty tool pack as will subsequently be discussed.

Details of the rear support are illustrated in FIG. 26 which shows a front view of the rear support. The actuating member 260 is provided with the base 270 having two drills 286 with bearings therein for mounting on rails 224. The slide interlocking member 274 for controlling relative movement between the forward and rear supports is also attached to the actuating member base. The cradle support member 264 having a concave supporting surface 234 at its top portion with the adjustable pads 238 mounted therein is mounted in abutting relationship with the actuating member with its base extending through the base of the actuating member base to rest upon the cam surface 266.

Figure 30:
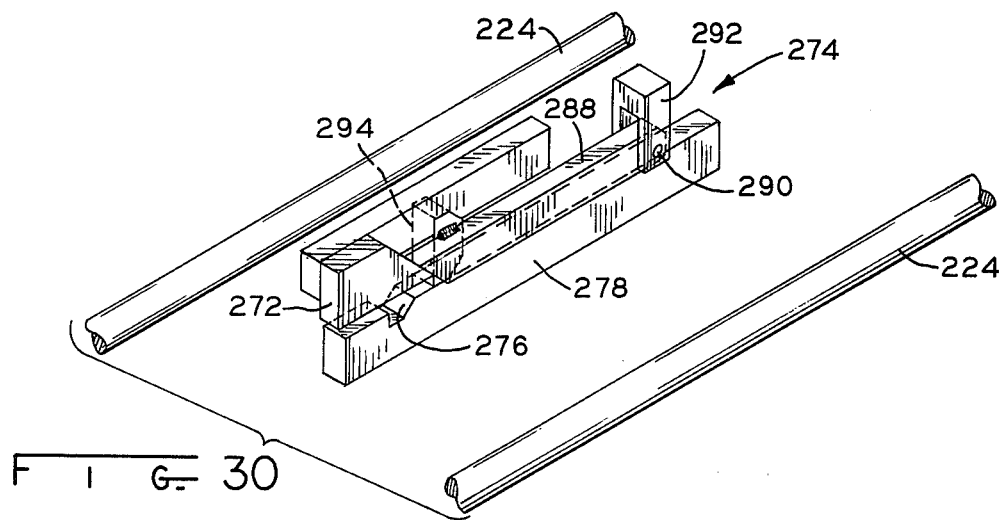
FIG. 30 is a perspective fragmentary view illustrating a slide interlocking member for controlling relative movement between the forward and rear supports of the tooling support.

The slide interlocking member is shown in more detail in FIG. 30. The member is provided with an arm 288 pivotally attached by pin 290 to a yoke 292 of the actuating member base and is also provided with a cam block 294 attached to the arm. FIG. 30 also shows the stationary member 278 having the recess 276 for accepting the cam block and thereby causing disengagement of the forward and rear supports during movement along the rails. Cam member 272 operating to disengage the cam block from the recess of the stationary member is also shown and is held in position by attachment to the base of the push slide.

Figure 22:
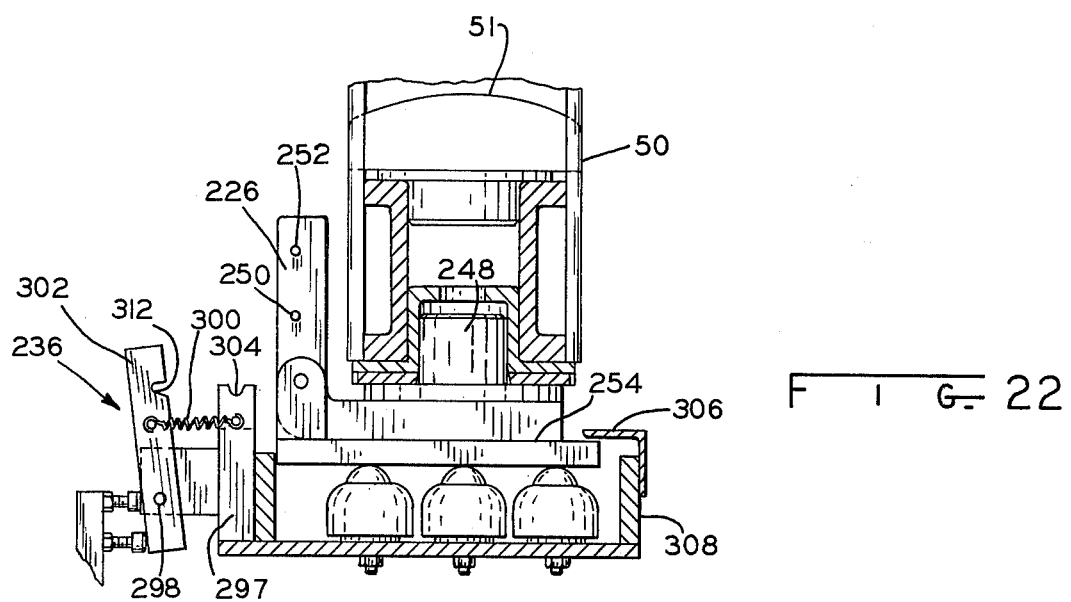
FIGS. 22 and 23 are fragmentary side elevational views, partly in cross-section, illustrating tool pack transfer to the transporting device.

After the tooling support has been moved to the load position, the transporting device is locked into position preventing lateral movement along its rails by roller cam 295, attached to the rear tooling support, being received in roller retainer 296 (shown in FIGS. 16 and 19); thus, the loaded tool pack can be transferred onto the tooling support. Further, the locking of the transport device allows adjustment of the core support in accordance with the axial length or height of the stator core. FIG. 22 shows the loaded tool pack 50 on tray 52 at the loading station. In order to separate the tool pack from the tray, the locking arrangement 236 is provided comprising a stationary member 297 connected by pivot pin 298 and spring 300 to a spring bias member 302. In effecting a transfer, the tool pack is moved to a horizontal position by pivoting the "L" shaped arm 226 causing the stop pin 250 to be received in recess 304 of the stationary member. Angle retaining member 306 attached to the conveyor frame 308 prevents excessive vertical movement of the tray base 254 as the tool pack is being moved to the horizontal position.

As mentioned previously, after it has been pivoted onto the tooling support, the tool pack is rotated on plug 248 until the aligning pin of the blade aligner abuts the top surface of the forward support. This rotation to abut the aligning pin and the initial equipment set-up adjustment of the adjustable pads 238 assure proper alignment of the tool pack for subsequent insertion into the wedge guide housing of the injection machine, thus preventing damage to the tool pack which could be caused by misalignment.

Figure 23:
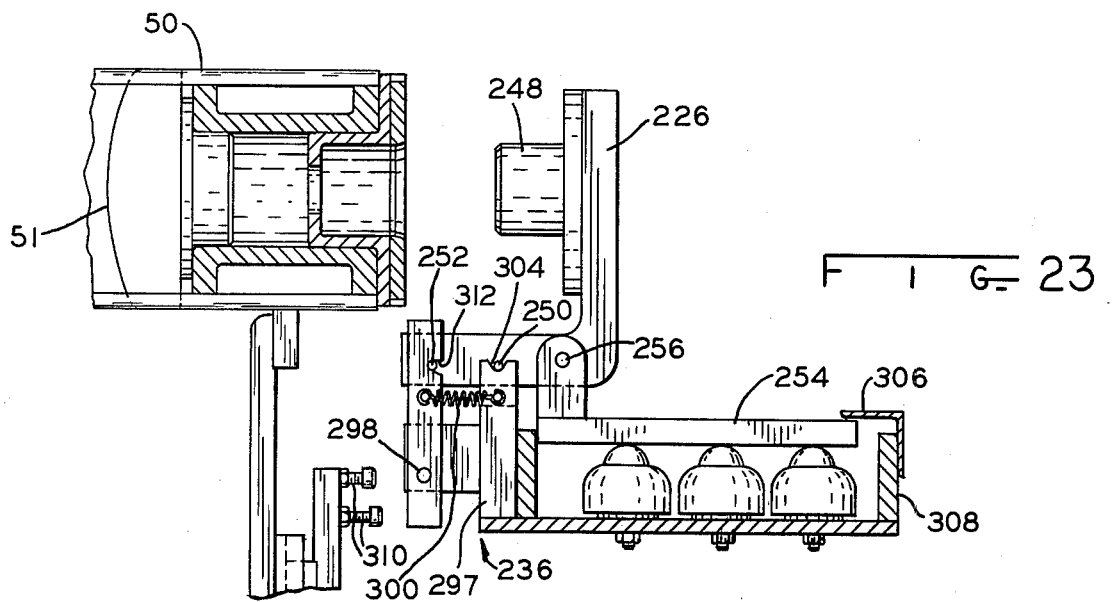

As shown in FIG. 23, the tool pack is then separated from the plug 248 of the tray by moving the tool pack and the rear support away from the tray causing projections 310 of the rear support to release the spring bias member allowing it to receive the locking pin 252 within its recess 312.

The outward movement of the tooling support away from the tray is illustrated by FIGS. 29, 28 and 27. As shown in FIG. 29, the cam block 294 of the slide interlocking member 274 is engaged in recess 280 of the push member 258, thus outward movement of the push member of the forward support causes the rear support to follow. As the forward and rear supports are moved outwardly along the rails 224, the notched support member 262 and the cradle support member 264 are cammed upwardly by the cam surface 266 to engage and support the top and base of the tool pack, respectively. When the supports are moved to the position shown in FIG. 28, the forward and rear supports are separated as the cam block 294 of the slide interlocking member is moved out of recess 280 by cam member 272 and into the recess 276 of the stationary member causing the rear support to stop with the forward support being allowed to continue movement until it reaches its outermost position as shown in FIG. 27.

The core 76 shown in FIG. 16 is also transferred to the transporting device by positioning it on the core support 82 which is illustrated in detail in FIGS. 31-34. The core is radially oriented on the support so as to assure proper alignment with the blades of the tool pack at the injection machine. This orientation may be accomplished by marking the core at a predetermined point with tape, paint or other means and then orienting the core so that the mark is at a predetermined radial position relative the core support.

As shown in FIG. 31, which is a top view of the support, the core support is slidably mounted on rails 314 attached to stationary members 316 and 318. The rails are received in drills 320 having bearings therein of the base members 322, 324 as shown in FIG. 33. The core is positioned upon two support members 326 connected to two end plates 328 and 330 at the top surfaces thereof and also longitudinally positioned in an abutting relationship with the core abutment means illustrated as the two retaining arms 242 for preventing lateral movement of the core relative to the core support during coil insertion as will be subsequently discussed. The retaining arms are interconnected with each other by member 332 and supported on the core by gear driven threaded members 334, 336, and 338 which are attached at one end thereof to the end plate 328 by threaded bushings 342 mounted within the end plate. In order to provide adjustment of the retaining arms to accommodate a particular stator height or axial core length, the other end of the gear driven threaded members extend through the end plate 330 and are provided with gears 344 with the gears being interconnected for movement relative to each other by interconnecting gear 346 as illustrated in FIG. 34.

As shown in FIG. 31, the core support is also provided with a locking tongue 348 for use in locking the core support in a fixed position during coil insertion at the injection machine as will be subsequently discussed. The locking tongue is attached to the two end plates of the core support at the bottom with one end thereof extending beyond stationary member 318 and having an opening 350 for receiving a shot pin for locking the support.

Figure 17:
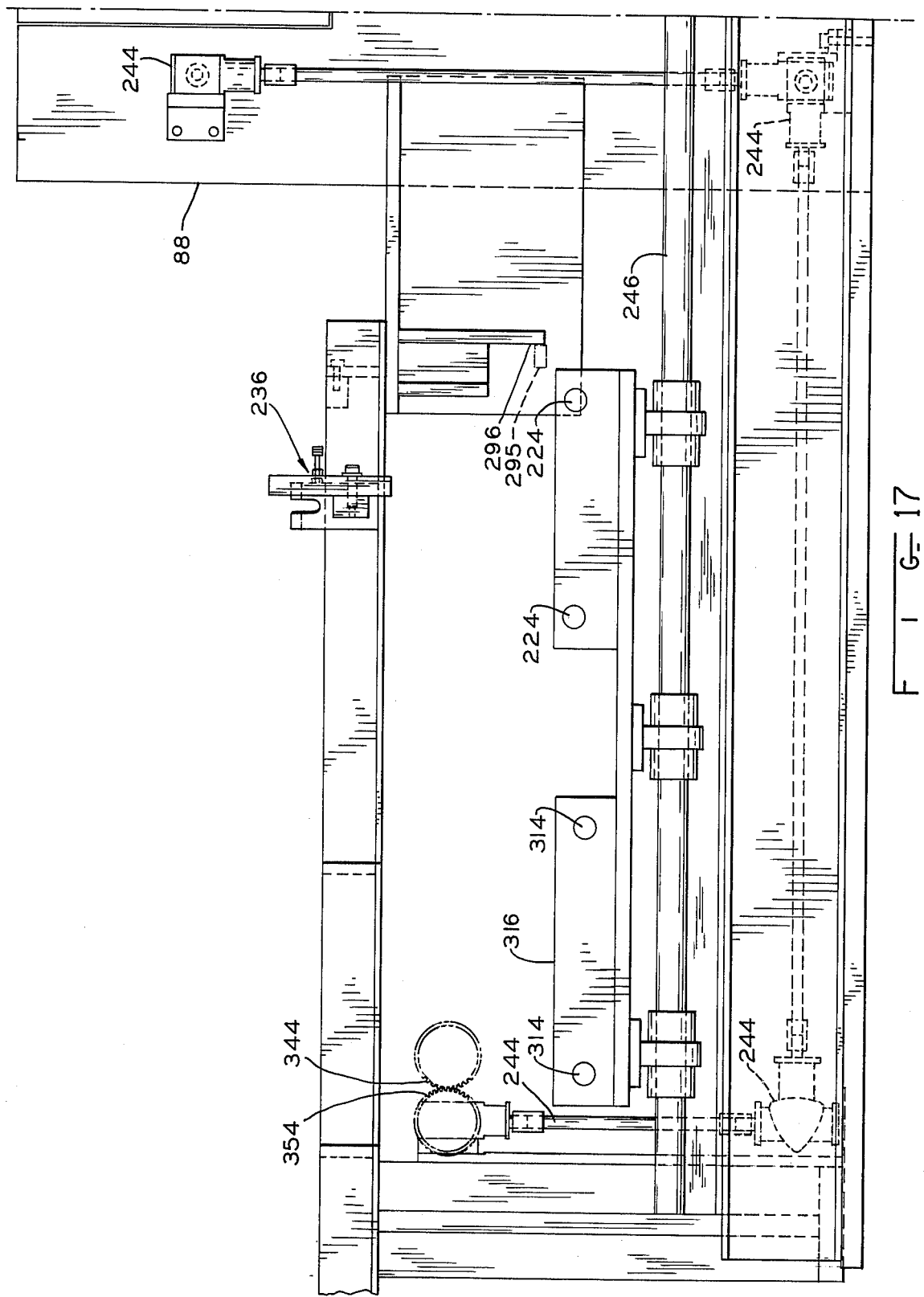
FIG. 17 is a fragmentary side elevational view, with parts removed, of the loading station, illustrating core support adjustment interconnection.

In order to adjust the core abutment means or the retaining arms of the core support for a stator core of a particular height or axial length, adjustment motor 352 mounted at the injection machine as illustrated in FIG. 42 is energized to transmit an adjustment signal by way of linkage arrangement 244 to cause rotation of control gear 354 shown in FIG. 17. At the loading station, the control gear is engaged with one of the gears 344 as shown in FIG. 34 so that rotation of the control gear causes rotation of all the gears 344 of the threaded members 334, 336, 338. Rotation of the threaded members causes longitudinal movement of the arms connecting member 332 shown in FIG. 32 which also causes the retaining arms attached thereto to be adjusted for the particular stator core height. This adjustment of the retaining arms is performed while the transporting device is locked into position at the loading station, i.e., prior to movement of the tooling support to the "out" position so that the control gear is held in positive engagement with one of the control gears 344.

After the loaded tool pack and the core have been transferred to the transporting device and the device has been unlocked, the transporting device is then ready to be moved laterally along the rails 246 to the injection machine. To assure that the transporting device is properly positioned at the loading station, the injection machine and the unloading station, the transporting device is provided with a positioner 356 as illustrated in FIG. 24. The positioner comprises two bars 358 attached to plate 360 and slidably mounted within two end members 362. The positioner is also provided with a shock absorber 364 connected to the plate. The bars are slidably moved within the end members by actuating members 366 and 368 attached to the forward support and rear support, respectively, engaging portion 370 of the plate. The positioning of the transport device is accomplished by the bars engaging stops as the transporting device travels along the rails.

FIG. 35 shows the transporting device at the loading station with the loaded tool pack and the core supported thereon. The transporting device was positioned at the loading station by the positioner 356 engaging stop 372. The engagement of the stop was cushioned by the shock absorber 364 of the positioner engaging bumper 374. After the core and the loaded tool pack are loaded on the transporting device, the transporting device is then moved laterally along the transporting rails 246 into position at the injection machine. The positioning is accomplished by the positioner engaging stop 376 with this engagement being cushioned by the shock absorber engaging bumper 378.

In order to provide further assurance that the transporting device is in the proper position at the injection machine, limit switch 380 is provided with the limit switch being actuated by projection 382 extending from the transporting device as illustrated in FIG. 36. Actuation of the limit switch allows insertion of the blades of the tool pack into the bore of the core during the coil insertion operation and also allows ejection of the empty tool pack after the coil insertion operation as will be subsequently discussed.

With the transporting device properly positioned at the injection machine as shown in FIG. 36, the injection tooling or loaded tool pack is in alignment with the wedge guide housing 86. The wedge guide housing, as shown in detail in FIG. 39, is attached to the face 384 of the injection machine and has a plurality of wedge guides 386 retained therein. FIG. 39 shows the tool pack 50 with the blade aligner 74 fully inserted into the interior of the wedge guide housing.

Figure 20:
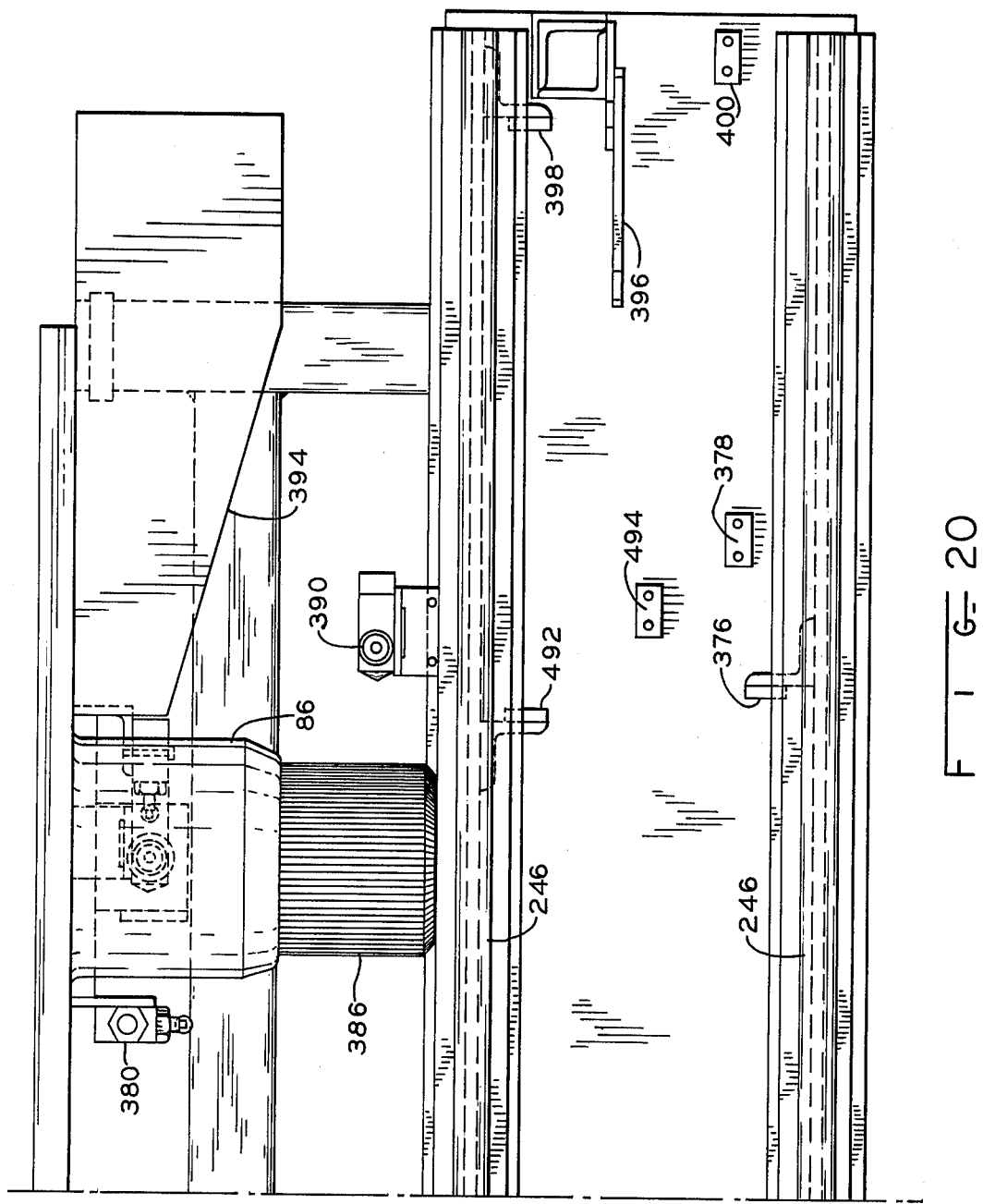
FIG. 20 is a plan view of the injection station illustrating hydraulic activation limit switch and positioner stop locations.

Prior to insertion of the tool pack, the tool pack support is in the same relative position as illustrated in FIG. 24. The tool pack is inserted into the housing by initially moving forward support 220 toward the wedge guide housing and into engagement with the rear support 222 causing both the forward and rear supports to move toward the wedge guide housing as illustrated in FIG. 28. Movement of the rear support causes an actuating member 388 attached thereto as illustrated in FIG. 24 to engage a limit switch 390 illustrated in FIG. 20. The limit switch activates a hydraulic cylinder 391 mounted on the transporting device and connected to the rear support, as illustrated in FIG. 19, causing the loaded tool pack to be fully inserted axially into the wedge guide housing. During this full insertion, the cradle support member 264 of the rear support is cammed downward along cam surface 266 as illustrated in FIG. 29 to avoid the wedge guide housing. The notched support member 262 of the forward support is also cammed downward along the cam surface thus removing it from contact with the support projection of the blade aligner. Inward movement of the tooling support also causes the positioner 356 to disengage stop 376 and bumper 378 illustrated in FIG. 36, thus permitting subsequent movement of the transporting device to align the empty core with the inserted tooling.

With the loaded tool pack fully inserted into the wedge guide housing, the transporting device is again moved laterally along the transporting rails to align the core with the wedge guide housing and the loaded tool pack. This movement causes the roller cam 295 on the rear support to move along cam member 394 shown in FIG. 16, to move the rear support outwardly and also causes catcher cam 396 to engage and pivot the catcher member 284 into the notch recess 228 of the notched support member. Thus, the tooling support is conditioned to receive and support the empty tool pack when it is subsequently removed from the injection machine.

Figure 18:
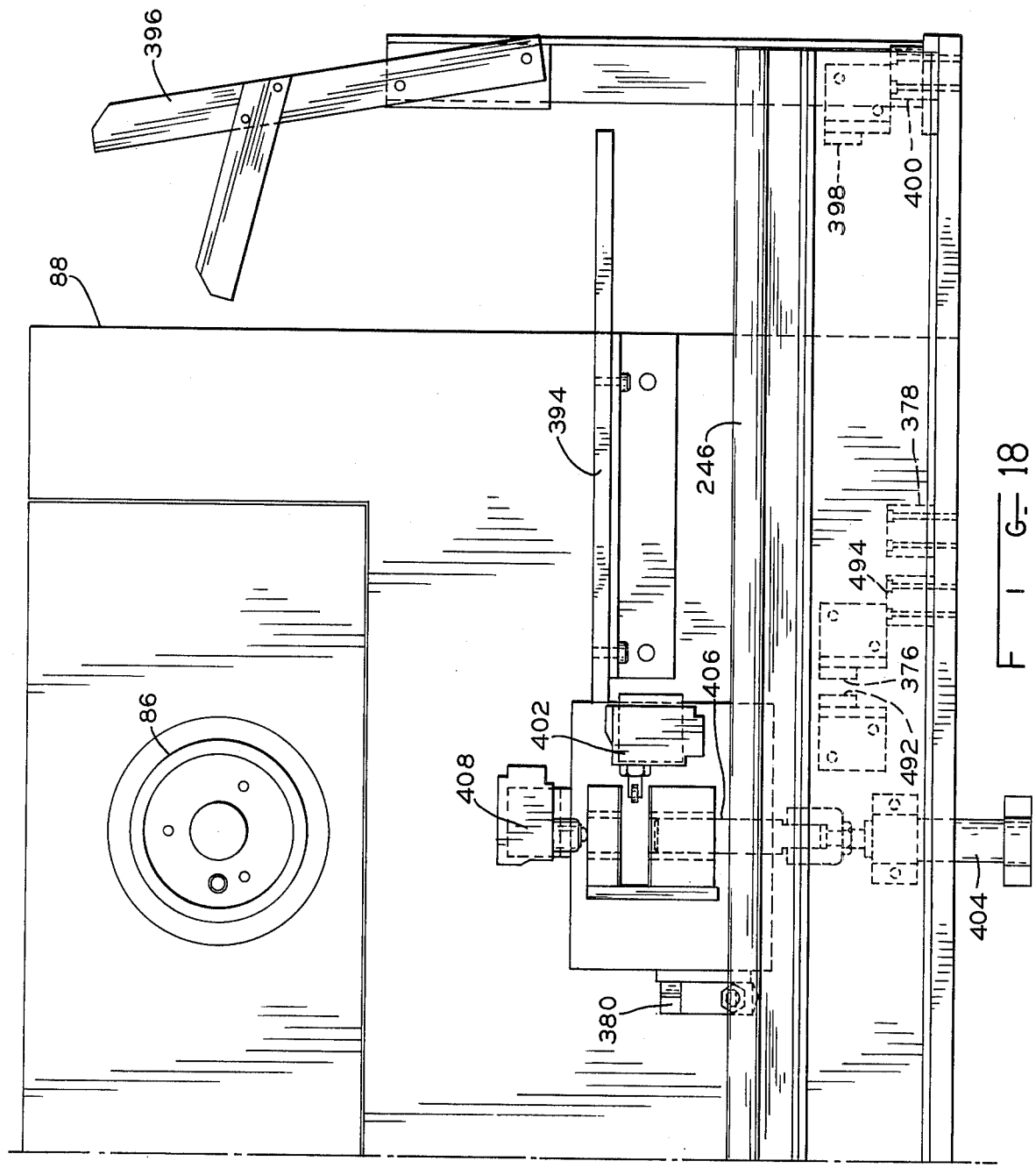
FIG. 18 is a front elevational view of the injection station illustrating core support locking arrangement for coil injection.

Referring to FIG. 37, the alignment of the core with the wedge guide housing and the loaded tool pack therein, is accomplished by the positioner 356 engaging stop member 398 with this engagement being cushioned by the shock absorber 364 contacting bumper 400. After alignment, the core support is then moved inwardly along its rails causing the core to slidably engage the top outer perimeter of the loaded tool pack and also causing the locking tongue 348 having opening 350 therein as illustrated in FIG. 31 to engage limit switch 402 shown in FIG. 18. Referring to FIG. 18, the limit switch 402 allows actuation of cylinder 404 through a foot switch (not shown) which in turn moves shot pin 406 through the opening of the core support locking member, thus locking the core support in the alignment position at the injection machine. In order to assure that the core support has been properly locked, limit switch 408 is mounted so that it will be activated by the shot pin when the pin is fully extended indicating that the support has been locked. When the core is aligned and locked into position, the injection machine is ready to inject the coils to the slots of the core.

Both coils and insulating wedges are injected into the empty stator core at the injection machine. FIG. 39 shows a sectional view of the wedge guide housing 86 with the tool pack 50 fully loaded therein. The stripper 51 is slidably received within the tool pack and is employed to strip or axially transfer the coils distributed on the tool pack into the slots of the stator core. Simultaneous with the insertion of the coils, insulating wedges are pushed through wedge guides 386 into the slots of the stator core.

Referring to FIGS. 39, 40 and 43, the injection operation is initiated by energizing injection motor 410 for driving screw members 412 and 414 which move push member 416. The push member moves a plurality of wedge pushers 418 longitudinally through slotted members of a wedge holder 420 to move wedge insulators contained therein through the wedge guides 386 and into slots of the stator core. Power assist cylinder 421 is energized simultaneously with the injection motor for moving the blades of the tool pack axially through the interior bore of the core by causing movement of blade injecting rod 422. The travel speed of the injecting rod is initially determined by the speed of the push member 416 which is controlled by the injection motor; however, continued movement of the push member causes connector 424 to disengage which allows the power assist cylinder to fully insert the blades of the tool pack through the bore of the core.

The injection motor continues to move the push member which in turn causes a variable stroke insertion member, shown as stripper rod 426 in the illustrated embodiment, to move the stripper 51 axially along the interior of the tool pack. The stripper causes the winding turns (not shown) on the tool pack to be moved along the blades and axially into the turn accommodating slots of the core. During the winding turn insertion, the stripper also pushes blade aligner 74 out of engagement with the tool pack where it is received by the machine operator. The stator core is retained in a fixed position on the core support during the above-described blade and winding turn insertion operation by the core abutment means of the core support.

After the coils comprising the winding turns are inserted into the core, the rotation of the injection motor is reversed causing retraction of the stripper rod which pulls the stripper back through the interior of the tool pack. The power assist cylinder is also activated simultaneously with the injection motor causing the blades of the tool pack to retract back through the bore and out of engagement with the core. The stripper within the tool pack is disengaged from the stripping rod as latch 428 is cammed outwardly at camming surface 430. The stripping rod continues to retract through opening 432 at the base of the tool pack and is locked in a retracted position as locking ball 434, within the bushing 436, is then moved along cam surface 438 into recess 440 of the stripping rod. Locking ball 442 which is spring loaded is also moved out of engagement with the tool pack and onto a tapered portion 444 of the bushing, thus unlocking the tool pack for subsequent ejection.

Referring to FIG. 39 in more detail, the plan view of the wedge guide housing 86 shows the tool pack 50 with blade aligner 74 therein slidably received within the wedge guides 386 of the wedge guide housing. In order to transfer coils mounted on the blades of the tool pack, stripper 51 is slidably mounted within the blades and provided with a latch 428 for connecting to the stripper rod 426 during coil insertion. After the stator core has been slidably positioned over the tool pack and blade aligner, coil insertion is performed by first moving the blades of the tool pack through the interior bore of the core by activating the power assist cylinder to move the injecting rod 422 longitudinally through the wedge guide housing. The variable stroke insertion member, i.e., stripper rod 426 having the bushing 436 and snap ring 446 thereon is also moved longitudinally through the wedge guide housing by activation of the injection motor. This longitudinal movement of the stripper rod causes the locking ball 442 to be cammed into tool pack recess 448, thus preventing further movement of the tool pack relative the stripper rod and also causing the locking ball 434 mounted within the bushing to be cammed along surface 438 for allowing the stripper rod to move relative the bushing. As it continues to move, the stripper rod engages the stripper and is latched thereto by latch 428 as shown by the dotted lines. As the stripper is moved within the tool pack by the stripper rod, coils (shown in FIG. 16) contained on the tool pack are moved along the blades and axially into the axially extending coil accommodating slots of the stator core (shown in FIG. 16). The stripper also pushes the blade aligner 74 out of engagement with the tool pack where it is received by the machine operator.

After the coils are inserted into the stator core, the power assist cylinder and the injection motor are activated to retract the blades of the tool pack and the stripper from the core. The retraction of the stripper rod causes the stripper to be pulled back through the tool pack because of the engagement of the latch 428 with the rod. The latch is cammed out of engagement at the surface 430 of the tool pack allowing the stripper rod to move alone back through the opening 432 of the tool pack and into the position as shown in FIG. 39. This retracting movement of the stripper rod causes the locking ball 434 to be cammed upward along surface 438 into engagement with the rod and also causes the spring loaded locking ball 442 to be cammed out of tool pack recess 444, thus releasing the tool pack for subsequent ejection.

FIGS. 40 through 43 show details of the injection machine which includes the wedge guides, the wedge guide housing, the wedge pushers and a wedge maker. A plan view of the injection machine is illustrated in FIG. 40 with wedge holder 420 of the wedge maker shown attached to the injection machine face plate 384. The wedge maker fabricates insulating wedges and places the wedges in the slotted members 450 of the wedge holder for subsequent insertion into the slots of the stator core by the wedge pushers 418 which extend between each of slotted members and pusher retaining ring 452 attached to the push member 416. The wedge pushers are employed to push the insulating wedges through the slotted members of the wedge holder, through the wedge guides of the wedge guide housing and into the slots of the stator core. The wedge pushers travel to approximately the tip of the wedge guides during the insertion of the insulating wedges.

FIG. 40 also shows details of the interconnection arrangement between the power assist cylinder 421 and the tool pack injecting rod 422 for causing insertion and retraction of the tool pack blades. The injecting rod extends through member 454 having friction rings 456 and through the pusher retainer ring 452 with its end being attached to support plate 458. The injecting rod is interconnected for movement by the power assist cylinder by connecting rod 460 and linkage 462. For blade movement through the bore of the core, the power assist cylinder is activated to move the injecting rod until the linkage contacts frame member 465.

As mentioned previously, the injection motor is activated simultaneously with the power assist cylinder; thus, as the injecting rod is moving the tool pack blades through the bore of the core, the injection motor is operating to move the stripper through the tool pack. The stripper rod 426 which moves the stripper is interconnected with the injection motor by way of the screw members 412, 414, the push member 416 and the member 454. Thus, activation of the injection motor drives the push member causing disengagement of connector 424 and engagement of the member 454 for moving the stripper rod. The push members' engagement of the member 454 causes the stripper rod to push the stripper through the interior of the tool pack, thus moving the coils axially from the tool pack into the core slots. For coil insertion, the injection motor is driven at normal speed until cam 455 engages limit switch 457, whereupon the motor is shifted to a slower speed to complete the insertion as determined by the cam actuating limit switch 459. After coil insertion, the stripper is retracted back through the tool pack by reversing the injection motor. The motor is driven at a normal reverse speed until the cam 455 engages limit switch 461, whereupon the motor is shifted to a slower speed to complete the stripper retraction with the complete retract position being determined by the actuation of limit switch 463 by the cam.

The frictional resistance encountered by the blades during movement through the interior bore of the core may vary with different stator cores. Thus, an aid for blade insertion is provided by the interconnection of the injecting rod with the stripper rod by way of the friction rings 456 at member 454. If the tool pack blades have not been fully inserted by the power assist cylinder, then the friction ring connection operates to allow the injection motor to complete the movement of the blades. If the power assist cylinder and the friction ring connection still do not fully insert the blades, then the insertion is completed by the stripper rod as the spring 466 attached thereto contacts and pushes the base of the tool pack at surface 468. If the power assist cylinder is unable to retract the blades, the stripper rod is allowed to retract, thus unlocking the tool pack for subsequent ejection with the blades still within the core.

FIG. 40 also shows ejection rod 470 for ejecting or removing the tool pack from the injection machine after the coils have been inserted into the stator. The ejection rod is activated for longitudinal movement by ejection cylinder 472 and extends slidably through frame member 465, the support plate, the push member and the member 454.

Motor driven arrangements illustrated in FIGS. 41 through 43 control the initial conditioning of the injection machine for a particular core height and the movement of the stripper through the tool pack. Referring to FIG. 42, a conditioning arrangement 475 including adjustment motor 352 is shown for simultaneously conditioning the injection machine and the stator core support for a particular stator core height as previously discussed in reference to FIGS. 17 and 34. The motor is connected to gear receiver 464 shown in FIG. 40 for adjusting the stroke of the power assist cylinder and thus, the longitudinal movement of the tool pack injecting rod 422. The gear receiver is also rotationally interconnected with the variable stroke insertion member, i.e., the stripper rod, for adjusting the longitudinal movement of the rod by adjusting the position of the member 454 relative to the push member 416. As mentioned previously, the stripper rod is moved during coil insertion when the push member engages the member 454, thus adjusting the relative distance between the two members, controls the stripper rod movement which in turn controls the axial travel distance of the stripper 51 within the tool pack. The motor is also connected through gear 478 and linkage 244 to the control gear as previously discussed for adjusting the core support. In order to condition the wedge maker to fabricate wedges of a proper length, the adjustment motor is also interconnected through gear 480 and linkage arrangement 482 to adjust the wedge maker in accordance with the stator height. A still further adjustment may be provided by interconnecting the adjustment motor and the winding machine through gear 484 so that the winding machine would also be adjusted for the proper stator height. Thus, through the adjustment arrangement, the injection machine is conditioned for a particular core height when the core support is adjusted for that particular core height while in position at the loading station.

Referring to FIG. 43, the injection motor with gear 486 is interconnected to the screw gears 488 and 490 to drive the screw members 412 and 414, respectively, as illustrated in FIGS. 41 and 43. As previously discussed, the screw members cause movement of the stripper rod to cause insertion of the coils into the slots of the stator core.

After the tool pack is retracted or removed from the stator core, the shot pin 406 illustrated in FIG. 18 is disengaged permitting movement of the transporting device to align the tooling support with the empty tool pack within the injection machine. The tooling support is ready to accept the empty tool pack with its catcher 284 positioned in the notched support member of the forward support for receiving and supporting the top of the tool pack. As previously discussed, the catcher member was pivoted into the receiving position by the catcher cam 396 illustrated in FIG. 18 when the core support was aligned at the injection machine.

The transporting device is moved along its rails as illustrated in FIG. 38 until the positioner 356 engages stop 492 and its shock absorber 364 engages bumper 494, thus stopping the transporting device when the tooling support is aligned with the empty tool pack retained within the wedge guide housing.

Referring to FIGS. 39 and 40, the empty tool pack is ejected from the wedge guide housing by energizing the ejection cylinder 472. The cylinder causes the ejection rod 470 to engage and push the empty tool pack out of the wedge guide housing onto the tooling support. The forward and rear supports are moved outwardly during the ejection by the tool pack pushing on the the catcher member causing the positioner to disengage the stop 492. The transporting device is then moved laterally along the rails 246 to the unloading station 90, which in this arrangement is at the same location as the loading station, for unloading the core and empty tool pack.

The transporting device is stopped when the empty tool pack is in alignment with its tray by the positioner engaging the stop 372 and the shock absorber engaging bumper 374 illustrated in FIG. 35. The empty tool pack is then unloaded from the tooling support by moving the forward and rear supports inwardly along its rails 224 as previously discussed in reference to FIGS. 27 through 29 until the empty tool pack is received in the plug member 248 on the tray 52 as illustrated in FIG. 23, and projections 310 of the rear support engage and pivot spring bias member 302 of the locking arrangement. The empty tool pack is moved to a vertical position by pivoting the L-shaped support arm 226 about pivot pin 256 as illustrated in FIG. 22. The empty tool pack is then conveyed back to the winding machine for placement of coils thereon and repeating the transporting and injection process.

The stator core is complete with the coils inserted in its slots, thus, it is removed from the core support and conveyed away from the station.

While the invention has been described in accordance with different embodiments thereof, variations will be readily apparent to those skilled in the art from reading the foregoing description. For example, multiple winding stations could be employed to furnish the loading station with loaded tool packs so as to assure maximum utilization of the transporting device and coil injection machine. Further, the completed stator core assembly with winding turns inserted therein could be conveyed directly away from the injection station by a means other than the transporting device.

Thus, in accordance with the Patent Statutes, I have described what at present is considered to be preferred embodiments of my invention, but it is to be clearly understood that this description is made only by way of example and not for purposes of limitation. Accordingly, it is intended by the appended claims to cover all modifications which come within the spirit and scope of the invention.

What I claim as new and desire to secure by Letters Patent of the U.S. is:

1. A method of fabricating winding turns on a dynamoelectric machine magnetic core having a bore therein and a plurality of axially extending winding turn accommodating core slots, the method comprising:
   supporting coil injection tooling with winding turns thereon and the magnetic core on transporting means at a first location;
   moving the transporting means with the winding turns, injection tooling, and core supported thereon to a second location;
   transferring the injection tooling with the winding turns thereon from the transporting means to a coil injection machine;
   aligning the magnetic core with the previously transferred injection tooling and relatively moving the injection tooling and core so that at least part of the injection tooling protrudes into the bore of the core;

transferring the winding turns from the injection tooling into turn accommodating core slots by moving winding turn portions axially along such slots;

relatively moving the injection tooling and core whereby the injection tooling is removed from the bore of the core; and transferring the injection tooling from the coil injection machine to transporting means.

2. The method of claim 1 wherein the transporting means includes core abutment means; and the method further comprises restraining the core from axial movement away from the injection tooling with the core abutment means while transferring the winding turns into the core slots.

3. The method of claim 2 further comprising: operatively interconnecting the transporting means and coil injection machine; adjusting the core abutment means relative to the transporting means so that the relative position of the core abutment means relative to a reference plane of the transporting means corresponds to the actual axial length of a core positioned on the transporting means; substantially simultaneously relatively adjusting portions of the coil injection machine because of the operative interconnection of the transporting means and the coil injection machine; and thereafter disabling the operative interconnection of the transporting means and coil injection machine.

4. The method of claim 3 wherein the coil injection machine includes a variable stroke insertion member, and wherein the step of relatively adjusting portions of the coil injection machine includes adjusting the actual stroke of the variable stroke insertion member.

5. The method of claim 4 wherein the coil injection machine includes wedge guides, a wedge guide housing, wedge pushers, and a wedge maker; and wherein the step of relatively adjusting portions of the coil injection machine includes the step of conditioning the wedge maker to make wedges having an axial length corresponding to a predetermined wedge length desired for the actual axial length of the core.

6. The method of claim 5 wherein transferring the injection tooling from the transporting means to the coil injection machine includes sliding the injection tooling axially along and into the wedge guide housing.

7. A method of moving dynamoelectric machine stator cores and coil injection tools on a transport device, the method comprising:

supporting a core on a first portion of the transport device and supporting a tool on a second portion of the transport device;

moving the transport device from a first station to a coil injection station with the second portion of the transport device in alignment with a coil injection machine and preventing movement of the transporting device beyond the coil injection station;

transferring the injection tool from the transport device to the coil injection machine and releasing the transport device for movement relative to the coil injection station;

moving the transport device relative to the coil injection station until the stator core is aligned with the tool;

locking the transport device against further relative movement;

injecting at least one coil of winding turns from the tool into the stator core;

releasing the transport device for movement relative to the injection station;

moving the transport device relation to the injection station until the second portion of the transport device is aligned with the injection tool and preventing further movement of the transport device;

transferring the injection tool from the injection machine to the transport device and releasing the transport device for movement toward an unload station;

moving the transport device to an unload station; and removing the injection tool and core having winding turns accommodated thereon from the transport device.

8. The method of claim 7 wherein the transport device further includes a base, the first portion of the transport device having core support means with a core retaining means movable relative to the base, and the second portion having injection tooling support means spaced apart from the core support means, and wherein the method further comprises: moving the injection tool support means toward the coil injection machine after the injection tool is aligned with the coil injection machine whereby the injection tool is released from the injection tooling support means and thereafter supporting the injection tool by the injection machine; moving the stator core into interfitting relation with the injection tool after the stator core is aligned with the injection tool by moving the core support means relative to the base of the transport device; and holding the stator core in coil receiving relation relative to the injection tool with the core retaining means.

9. The method of claim 7 wherein the injection machine includes a wedge guide housing, wedge guides, and wedge pushers; and wherein transferring the injection tool to the coil injection machine includes interfitting the injection tool with and interiorly of the wedge guides.

10. A method of fabricating winding turns on a dynamoelectric machine magnetic stator core having a bore therein and a plurality of axially extending winding turn accommodating core slots, the method comprising:

supporting coil injection tooling on a transporting tray;

moving the tooling and tray to a winding station;

clamping the tray with tooling thereon in an alignment position with a winding machine head at the winding station;

rotating the tooling to predetermined index positions relative to the winding head for developing and placing winding turns on the tooling;

releasing the tooling at the winding machine;

moving the tooling with winding turns thereon and supported by the tray to a loading station;

moving a stator core with axially extending slots to the loading station;

transferring the stator core to a core support of a transporting device;

transferring the tooling to a tooling support of the transporting device;

moving the transporting device with core and tooling thereon to a coil injection station;

transferring the tooling to a coil injection machine at the coil injection station;

aligning the core with the previously transferred tooling and interfitting the core with a portion of the tooling;

transferring the winding turns from the tooling by moving winding turn portions axially into the slots of the core;

removing the tooling from the interfitting relationship with the core; and removing the tooling from the coil injection machine and transferring the tooling with winding turns removed therefrom back to the winding station.

11. The method of claim 10 wherein the core support of the transporting device includes a core abutment means and wherein the method further comprises preventing axial movement of the core away from the injection tooling while transferring the winding turns into the core slots.

12. The method of claim 11 wherein the core support abutment means is operatively interconnected with the injection machine and wherein the method further comprises adjusting the core abutment means for the stator core height causing substantially simultaneous conditioning of the injection machine for the stator core height.

13. The method of claim 12 wherein the coil injection machine includes wedge guides, a wedge guide housing, wedge pusher, and a wedge maker.

14. Apparatus for use in axially transferring winding turns from an injection tool pack to axially extending slots of a dynamoelectric machine magnetic core having a bore therein, said apparatus comprising: a transporting device movable from a first location to a second location while an injection tool pack with winding turns accommodated thereon and a magnetic core are supported on the transporting device, said second location being adjacent to a portion of the apparatus comprising a coil injection machine having a plurality of wedge guides supported by a wedge guide housing; means for moving the tool pack axially along and interiorly of said wedge guide housing; means for holding the core with the bore thereof in aligned and interfitting relationship with said tool pack; means for moving the winding turns axially along said tool pack and axially into slots of the core; and means for transferring said tool pack from said wedge guide housing to the transportable device at said second location.

15. The apparatus of claim 14 wherein the transportable device includes core abutment means and further comprises: means for operatively interconnecting the core abutment means of the transportable device and the coil injection machine; means for adjusting the core abutment means for the magnetic core height, said means for adjusting also being effective to condition the coil injection machine for the magnetic core height.

16. The apparatus of claim 15 wherein the injection machine includes a variable stroke insertion member and wherein the conditioning of the coil injection machine for the magnetic core height includes establishing the actual stroke of the variable stroke insertion member.

17. The apparatus of claim 15 wherein the injection machine includes a wedge maker and wedge pushers and wherein the conditioning of the coil injection machine for the magnetic core height includes establishing the length of wedges fabricated by the wedge maker.

18. Apparatus for use in fabricating winding turns on coil injection tooling and for use in axially transferring the winding turns from the coil injection tooling to axially extending slots of a dynamoelectric machine magnetic core having a bore therein, said apparatus comprising: means for moving coil injection tooling to a winding station and positioning the coil injection tooling relative a winding head of a winding machine at the winding station; an indexing mechanism for controlling rotational movement of the coil injection tooling relative the winding head for disposing on the coil injection tooling winding turns developed by the winding machine; a transporting device having a core support and tooling support at spaced apart locations thereon for accepting and supporting a slotted stator core and the coil injection tooling with winding turns thereon at a loading station after the tooling has been transferred from the winding station and said transporting device being operative to move the slotted stator core and the coil injection tooling from the loading station to a coil injection station; a positioning means for aligning the coil injection tooling with a wedge guide housing of a coil injection machine at the winding station; said tooling support of the transporting being operative to move the coil injection tooling axially along and interiorly of said wedge guide housing; said core support of the transporting device being operative to move the slotted stator core axially into an aligned and interfitting relationship with said coil injection tooling and having a core abutment means for retaining this interfitting and aligned relationship; stripping means for moving the winding turns axially along said coil injection tooling and axially into slots of the slotted stator core; and an ejection means for transferring said coil injection tooling from said guide housing to the tooling support at the coil injection station.

19. The apparatus of claim 18 and further including a conditioning arrangement for adjusting said core abutment means according to the axial length of the slotted stator core and for substantially simultaneously adjusting portions of the coil injection machine for the same axial length of stator core.

20. The apparatus of claim 19 wherein the coil injection machine includes a wedge maker and wedge pushers and wherein the conditioning arrangement is operatively connected to the wedge maker for establishing the length of wedges fabricated by the wedge maker in accordance with the axial length of the stator core.

21. The apparatus of claim 14 wherein the injection machine includes a variable stroke insertion member and wherein the coil injection machine is conditioned for the magnetic core height with such conditioning including establishing the actual stroke of the variable stroke insertion member.

22. The method of claim 1 wherein the coil injection machine includes tooling in the form of wedge guide means and wherein the transferring of the injection tooling with the winding turns thereon from the transporting means to the coil injection machine includes interfitting the injection tooling with wedge guide means.

23. The method of claim 22 wherein the transferring of the injection tooling from the coil injection machine to transporting means includes removing the injection tooling from the wedge guide means.

* * * * *